United States Patent
McCraney et al.

(10) Patent No.: US 12,354,172 B1
(45) Date of Patent: *Jul. 8, 2025

(54) METHOD, APPARATUS, AND COMPUTER PROGRAM PRODUCT FOR VALIDATING ELECTRONIC DISTRIBUTION TRANSACTIONS AND REDUCING NON-COMPLIANT ELECTRONIC DISTRIBUTION TRANSACTIONS

(71) Applicant: Wells Fargo Bank, N.A., San Francisco, CA (US)

(72) Inventors: Jeffrey L. McCraney, Saint Charles, MO (US); Lara A. Kramer, St. Louis, MO (US); Sarah Lynn Auvil, Charlotte, NC (US); M. David Thomas, Mechanicsville, VA (US); Kenneth R. Bergeson, San Francisco, CA (US); Krista K. Norman, Charlotte, NC (US); Jack R. Zentmeyer, Davidson, NC (US); Natalie Reitz Hurst, Concord, NC (US); Cathy A. Shea, Minneapolis, MN (US); Darrel Rogers, Troy, IL (US); Daniel R. Sumerfelt, Sahuarita, AZ (US); Deepti Suresh, Maharashtra (IN); Piotr Tadeusz Gumulka, Chandler, AZ (US); Marco Antonio Pontes, Gilbert, AZ (US); Devin Mauzy, Charlotte, NC (US); Michael Connors, St. Louis, MO (US); Linda J. Class, West Sacramento, CA (US); Janice V. Lobben, Pequot Lakes, MN (US); Robert J. Young, Jr., Salisbury, NC (US); Frederick StClair, St. Louis, MO (US); Paulo Alberto Goncalves, Fort Meyers, FL (US)

(73) Assignee: Wells Fargo Bank, N.A., San Francisco, CA (US)

( * ) Notice: Subject to any disclaimer, the term of this patent is extended or adjusted under 35 U.S.C. 154(b) by 40 days.

This patent is subject to a terminal disclaimer.

(21) Appl. No.: 18/160,716

(22) Filed: Jan. 27, 2023

Related U.S. Application Data

(63) Continuation of application No. 16/916,770, filed on Jun. 30, 2020, now Pat. No. 11,593,890.

(51) Int. Cl.
 *G06Q 40/00* (2023.01)
 *G06F 9/54* (2006.01)
 (Continued)

(52) U.S. Cl.
 CPC ............. *G06Q 40/10* (2013.01); *G06F 9/541* (2013.01); *G06N 5/025* (2013.01); *G06Q 40/06* (2013.01)

(58) Field of Classification Search
 CPC .............................. G06Q 40/10; G06Q 40/06
 See application file for complete search history.

(56) References Cited

U.S. PATENT DOCUMENTS

| | | | | |
|---|---|---|---|---|
| 5,933,815 A | * | 8/1999 | Golden | G06Q 20/102 705/40 |
| 6,401,079 B1 | * | 6/2002 | Kahn | G06Q 20/102 705/30 |

(Continued)

FOREIGN PATENT DOCUMENTS

| | | | | |
|---|---|---|---|---|
| WO | WO-2005086728 A2 | * | 9/2005 | G06Q 30/00 |
| WO | WO-2016044608 A1 | * | 3/2016 | G06Q 40/04 |

OTHER PUBLICATIONS

Anonymous, "Thinking About Moving Your Retirement Savings", PFS Investments, Inc., Primerica Advisors, 2017 (Year: 2017).*

(Continued)

*Primary Examiner* — Abhishek Vyas
*Assistant Examiner* — William B. Bunker
(74) *Attorney, Agent, or Firm* — K&L Gates LLP

(57) ABSTRACT

A method, apparatus and computer program product are provided for validating electronic distribution transactions and reducing non-compliant electronic distribution transactions. A distribution application enables users to enter details relating to a retirement account distribution. A tax service integrated with the distribution application provides scenario-specific tax withholding information, and enforces relevant tax withholding rules. A user provides withholding information and the system ensures compliance by validating the transaction against the withholding rules. The system displays to the user error that need to be corrected, and a breakdown of the proceeds from the transaction. The tax service is implemented remotely from the distribution application so that changing tax regulations may be implemented (Continued)

into the tax service without impacting the distribution application. The tax service may utilize a customer's state of residence, age (and/or date of birth), and citizenship status such that state tax withholding information and validation, and requirement minimum distribution rules.

20 Claims, 16 Drawing Sheets

(51) Int. Cl.
    *G06N 5/025*     (2023.01)
    *G06Q 40/06*     (2012.01)
    *G06Q 40/10*     (2023.01)

(56) References Cited

U.S. PATENT DOCUMENTS

| | | |
|---|---|---|
| 7,305,347 B1 | 12/2007 | Joao |
| 7,613,641 B1 | 11/2009 | Jenkins et al. |
| 7,630,929 B1 | 12/2009 | Fisher et al. |
| 7,917,415 B1 * | 3/2011 | Petruzzi ............ G06Q 40/12 705/30 |
| 8,103,566 B1 * | 1/2012 | Petruzzi ............ G06Q 40/00 705/30 |
| 8,732,057 B1 * | 5/2014 | Becker ............ G06Q 40/06 705/35 |
| 10,949,178 B1 | 3/2021 | Russell |
| 11,042,933 B1 * | 6/2021 | Co ............ G06Q 20/108 |
| 2003/0105692 A1 | 6/2003 | Gilbert et al. |
| 2006/0020501 A1 | 1/2006 | Leicht et al. |
| 2008/0189224 A1 * | 8/2008 | Coopersmith ....... G06Q 40/10 705/36 R |
| 2016/0364806 A1 * | 12/2016 | Lee ............ G06Q 40/10 |
| 2020/0111160 A1 | 4/2020 | Shapiro |

OTHER PUBLICATIONS

Anonymous, "Base Plan Account Withdrawal," Persi, Public Employee Retirement Plan of Idaho, 2020 (Year: 2020).*
Perez, "Learn About Withholding on Retirement Plan Distributions," the Balance, www.thebalance.com, 2017 (Year: 2017).*
Anonymous, "Wisconsin Retirement System Retiree Monthly Tax Withholding Calculator," https://etf.wi.gov/retirement/calculators, Jun. 5, 2020 (Year: 2020).
William Perez, "Learn About Withholding on Retirement Plan Distributions," the balance, web.archive.org/web/2017.2017 (Year: 2017).
Anonymous, "Instructions for Forms 1099-R and 5498—Introductory Material," IRS publication, www.irs.gov/instructions/1099r 2020 (Year: 2020).
Anonymous, "Withholding Certificate for Periodic Pension or Annuity Payments," IRS form W-4P, www.irs.gov 2020 (Year: 2020).

* cited by examiner

Withdraw Funds

From ⟶ 500

[ Intuitive Investor Trad IRA *1234  ⌄ ]

Total value $25,000.00 as of 10:40 ET on 06/17/2019.
This includes $10,000.00 in available cash.

Need to make more cash available for your withdrawal?

Are you withdrawing more than $10,000? ⟶ 502

- ● Yes
- ○ No

Frequency ⟶ 504

- ● One time
- ○ Recurring

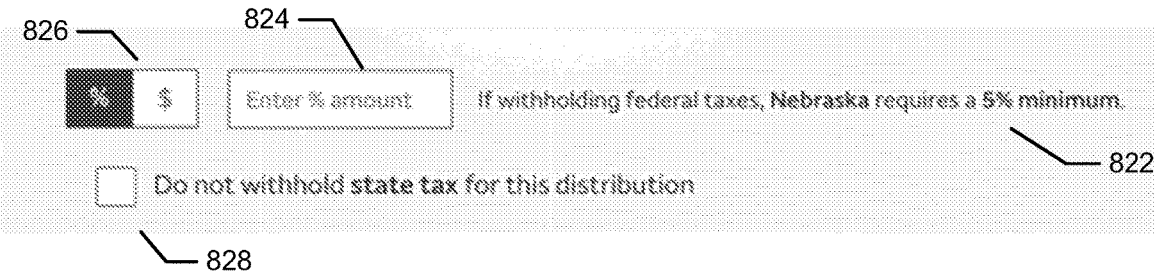
FIG. 9F
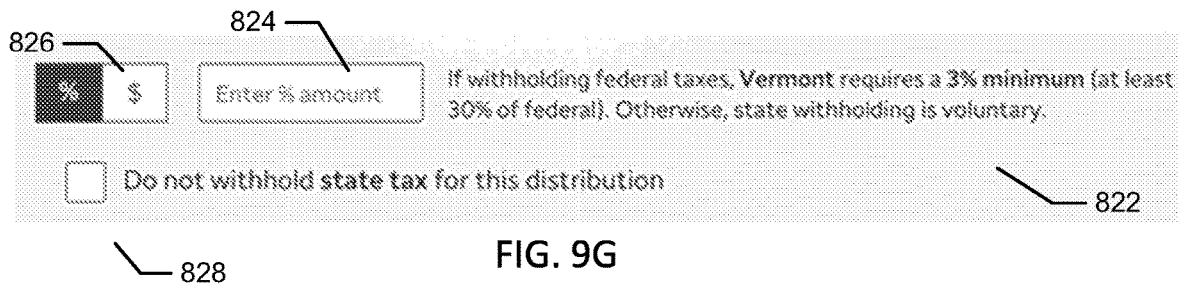
FIG. 9G
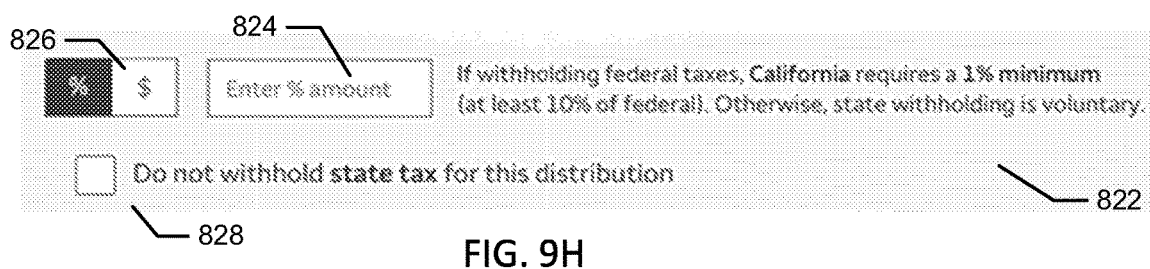
FIG. 9H
Result: On your $10,000 withdrawal, we'll withhold $1,000 for federal taxes and $400 for state tax, leaving you with a net distribution of $8,600.
FIG. 9I > Success: You've started your IRA distribution. You'll receive an email confirmation and can view the status on *Portfolio Activity*.

Distribution summary

| | | | |
|---|---|---|---|
| Confirmation number | 019-1029-1029 | Gross distribution amount | $10,000 |
| Date | dd/mm/yyyy | Federal tax withholding | $0 |
| Account | Roth IRA ....5555 | State tax withholding | $0 |
| Name on account | John Smith | Net distribution amount | $9,005 |
| Delivery address | 123 Huntington Lane, Hartford, CT, 28205 | Delivery method | Paper check - Standard (3-5 business days) |

METHOD, APPARATUS, AND COMPUTER PROGRAM PRODUCT FOR VALIDATING ELECTRONIC DISTRIBUTION TRANSACTIONS AND REDUCING NON-COMPLIANT ELECTRONIC DISTRIBUTION TRANSACTIONS

CROSS-REFERENCE TO RELATED APPLICATIONS

This application is a continuation of U.S. patent application Ser. No. 16/916,770, filed Jun. 30, 2020, the content of which is incorporated herein by reference in its entirety.

TECHNOLOGICAL FIELD

Embodiments of the present invention relate generally to electronic distribution transactions and, more particularly, to methods, apparatuses, and computer program products for validating electronic distribution transactions, and preventing or reducing non-compliant electronic distribution transactions from being fulfilled.

BACKGROUND

Custodians, financial institutions, and related service providers may provide a self-service website or application to enable customers to electronically withdraw money from their investment accounts. Similar applications may be used to withdraw funds from individual retirement accounts (IRAs). However, complicated federal and state laws relating to IRAs place many custodians and transaction facilitators at risk of violating such laws. Because conventional online systems are unable to incorporate those laws or factor their effects into those systems, conventional online systems block such transactions from occurring online, and instead prompt customers (e.g., users), to abandon their online transaction and instead call customer service in order to complete their transaction.

During a phone call with a customer requesting a distribution, customer service representatives may reference the various federal and state laws, depending on the state of residence of the account owner, requiring a lengthy process and/or extensive knowledge on the part of the customer service representative to enforce the relevant regulations. Additionally, the customer service representatives may introduce human error such that the custodian or provider fails to comply with the applicable tax laws.

BRIEF SUMMARY

Methods, apparatuses, and computer program products are therefore provided for providing electronic distribution transactions, validating electronic distribution transactions, and reducing or preventing non-compliant electronic distribution transactions from being fulfilled.

A system is provided comprising a distribution application and tax service. The distribution application may be configured to receive an indication of a request for a retirement account distribution, the request for the retirement account distribution comprising at least a distribution amount. The distribution application may be further configured to access account information associated with the request for the retirement account distribution, and responsive to receiving the indication of the request for the retirement account distribution, invoke an application programming interface (API) of a tax service, the tax service implemented remotely from the distribution application, the invocation of the API configured to request, from the tax service, tax withholding requirements specific to the account information.

The distribution application may be further configured to receive from the tax service, information indicative of the tax withholding requirements specific to the account information, and provide, via a user interface, user interface elements indicative of the tax withholding requirements. The distribution application may be further configured to enable modification of the distribution amount, and entry of a state tax withholding amount and a federal tax withholding amount, and invoke the API of the tax service to validate the distribution amount, the state tax withholding amount, and the federal tax withholding amount. In certain embodiments, the distribution application enables the modification of the distribution amount by enabling entry of a desired net distribution amount, and applying fees, the tax withholding amount, and the federal withholding amount to calculate a modified distribution amount.

The distribution application may be further configured to receive a response from the tax service and in response thereto, displaying an error or enabling a user to continue to submit the retirement account distribution for fulfillment.

The distribution application is further configured to receive a response from the tax service indicating validation of the retirement account distribution resulted in at least one rule violation in the tax withholding rules, and in response to the indication of the at least one rule violation, prevent the retirement account distribution from being submitted for processing.

The distribution application may be further configured to determine that the distribution amount is indicative of an account liquidation, and indicate, to the tax service, the account liquidation, wherein the response from the tax service is dependent on the account liquidation.

The distribution application may be further configured to determine fees associated with the retirement account distribution, calculate a net amount based on the distribution amount, the tax withholding amount, the federal withholding amount, and the determined fees, and cause display of the net amount via the user interface. In certain embodiments, the distribution application is further configured to cause display of a visualization of a breakdown of the retirement account distribution, the visualization comprising respective non-zero amounts of at least one of the distribution amount, the tax withholding amount, the federal withholding amount, or the determined fees.

The tax service may be implemented independently from the distribution application, and may be tax service configured to maintain tax withholding rules pertaining to state tax withholding requirements and federal tax withholding requirements, provide the API to an interfacing application, and receive requests via the API to provide scenario-specific withholding requirements. The tax service is configured to provide the scenario-specific withholding requirements from the tax withholding rules pertaining to state tax withholding requirements and federal tax withholding requirements, and validate distributions for scenario-specific withholding requirements by executing the tax withholding rules with data passed from the interfacing application. The account information may include a state of residence of an account holder and the tax service is configured to maintain tax withholding rules by state.

An apparatus is provided comprising at least one processor and at least one memory including computer program code. The at least one memory and the computer program code may be configured to, with the processor, cause the apparatus to at least receive an indication of a request for a retirement account distribution, the request for the retirement account distribution comprising at least a distribution amount. The at least one memory and the computer program code may be further configured to cause the apparatus to access account information associated with the request for the retirement account distribution, and, responsive to receiving the indication of the request for the retirement account distribution, invoke an application programming interface (API) of a tax service, the tax service implemented remotely from the apparatus, the invocation of the API configured to request, from the tax service, tax withholding requirements specific to the account information.

The at least one memory and the computer program code may be further configured to cause the apparatus to receive from the tax service, information indicative of the tax withholding requirements specific to the account information, and to provide, via a user interface, user interface elements indicative of the tax withholding requirements. The at least one memory and the computer program code may be further configured to cause the apparatus to enable modification of the distribution amount, and entry of a state tax withholding amount and a federal tax withholding amount, invoke the API of the tax service to validate the distribution amount, the state tax withholding amount, and the federal tax withholding amount, and receive a response from the tax service and in response thereto, displaying an error or enable a user to continue to submit the retirement account distribution for fulfillment.

The at least one memory and the computer program code may be further configured to cause the apparatus to receive a response from the tax service indicating validation of the retirement account distribution resulted in at least one rule violation in the tax withholding rules, and in response to the indication of the at least one rule violation, prevent the retirement account distribution from being submitted for processing.

The at least one memory and the computer program code may be further configured to cause the apparatus to determine that the distribution amount is indicative of an account liquidation, and indicate, to the tax service, the account liquidation, wherein the response from the tax service is dependent on the account liquidation. The at least one memory and the computer program code may be further configured to cause the apparatus to determine fees associated with the retirement account distribution, calculate a net amount based on the distribution amount, the tax withholding amount, the federal withholding amount, and the determined fees, and cause display of the net amount via the user interface.

The at least one memory and the computer program code may be further configured to cause the apparatus to cause display of a visualization of a breakdown of the retirement account distribution, the visualization comprising respective non-zero amounts of at least one of the distribution amount, the tax withholding amount, the federal withholding amount, or the determined fees.

A method is also provided, including receiving an indication of a request for a retirement account distribution, the request for the retirement account distribution comprising at least a distribution amount, accessing account information associated with the request for the retirement account distribution, and, responsive to receiving the indication of the request for the retirement account distribution, invoking an application programming interface (API) of a tax service, the tax service implemented remotely from the distribution application, the invocation of the API configured to request, from the tax service, tax withholding requirements specific to the account information. The method may further include receiving from the tax service, information indicative of the tax withholding requirements specific to the account information, and providing, via a user interface, user interface elements indicative of the tax withholding requirements. The method further includes enabling modification of the distribution amount, and entry of a state tax withholding amount and a federal tax withholding amount, invoking the API of the tax service to validate the distribution amount, the state tax withholding amount, and the federal tax withholding amount, and receiving a response from the tax service and in response thereto, displaying an error or enable a user to continue to submit the retirement account distribution for fulfillment.

The method may further include maintaining tax withholding rules pertaining to state tax withholding requirements and federal tax withholding requirements, providing the API to an interfacing application, receiving requests via the API to provide scenario-specific withholding requirements, providing the scenario-specific withholding requirements from the tax withholding rules pertaining to state tax withholding requirements and federal tax withholding requirements, and validating distributions for scenario-specific withholding requirements by executing the tax withholding rules with data passed from the interfacing application. The method may further include receiving a response from the tax service indicating validation of the retirement account distribution resulted in at least one rule violation in the tax withholding rules, and in response to the indication of the at least one rule violation, preventing the retirement account distribution from being submitted for processing.

The method may further include determining that the distribution amount is indicative of an account liquidation, and indicating, to the tax service, the account liquidation, wherein the response from the tax service is dependent on the account liquidation. The method may further include determining fees associated with the retirement account distribution, calculating a net amount based on the distribution amount, the tax withholding amount, the federal withholding amount, and the determined fees, and causing display of the net amount via the user interface.

The method may further include causing display of a visualization of a breakdown of the retirement account distribution, the visualization comprising respective non-zero amounts of at least one of the distribution amount, the tax withholding amount, the federal withholding amount, or the determined fees. The method further includes enabling entry of a desired net distribution amount, and applying fees, the tax withholding amount, and the federal withholding amount to calculate a modified distribution amount.

A computer program product is provided, comprising at least one non-transitory computer-readable storage medium having computer-executable program code instructions stored therein, the computer-executable program code instructions comprising program code instructions to receive an indication of a request for a retirement account distribution, the request for the retirement account distribution comprising at least a distribution amount, access account information associated with the request for the retirement account distribution, and, responsive to receiving the indication of the request for the retirement account distribution, invoke an application programming interface (API) of a tax service, the tax service implemented remotely from the distribution application, the invocation of the API configured to request, from the tax service, tax withholding requirements specific to the account information. The computer-executable program code instructions comprising program code instructions to receive from the tax service, information indicative of the tax withholding requirements specific to the account information, and providing, via a user interface, user interface elements indicative of the tax withholding requirements. The computer-executable program code instructions comprising program code instructions to enable modification of the distribution amount, and entry of a state tax withholding amount and a federal tax withholding amount, invoking the API of the tax service to validate the distribution amount, the state tax withholding amount, and the federal tax withholding amount, and receive a response from the tax service and in response thereto, display an error or enable a user to continue to submit the retirement account distribution for fulfillment.

An apparatus is also provided, including means for receiving an indication of a request for a retirement account distribution, the request for the retirement account distribution comprising at least a distribution amount, means for accessing account information associated with the request for the retirement account distribution, and, means for, responsive to receiving the indication of the request for the retirement account distribution, invoking an application programming interface (API) of a tax service, the tax service implemented remotely from the distribution application, the invocation of the API configured to request, from the tax service, tax withholding requirements specific to the account information. The apparatus may further includes means for receiving from the tax service, information indicative of the tax withholding requirements specific to the account information, and means for providing, via a user interface, user interface elements indicative of the tax withholding requirements. The apparatus further includes means for enabling modification of the distribution amount, and entry of a state tax withholding amount and a federal tax withholding amount, means for invoking the API of the tax service to validate the distribution amount, the state tax withholding amount, and the federal tax withholding amount, and means for receiving a response from the tax service and in response thereto, displaying an error or enable a user to continue to submit the retirement account distribution for fulfillment.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the disclosure in any way. It will be appreciated that the scope of the disclosure encompasses many potential embodiments, some of which will be further described below, in addition to those here summarized.

BRIEF DESCRIPTION OF THE SEVERAL VIEWS OF THE DRAWINGS

Figure 1:
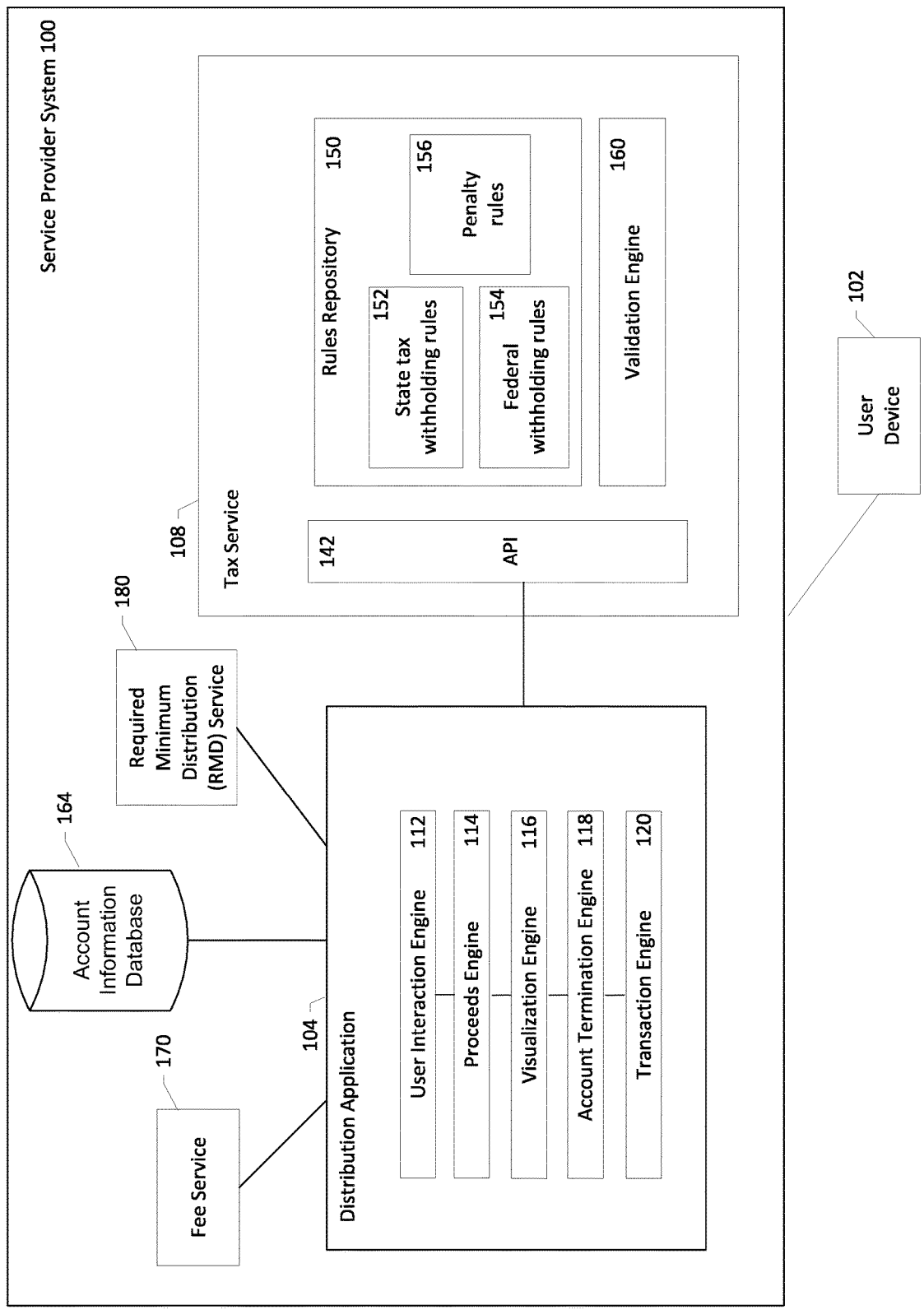
Figure 2:
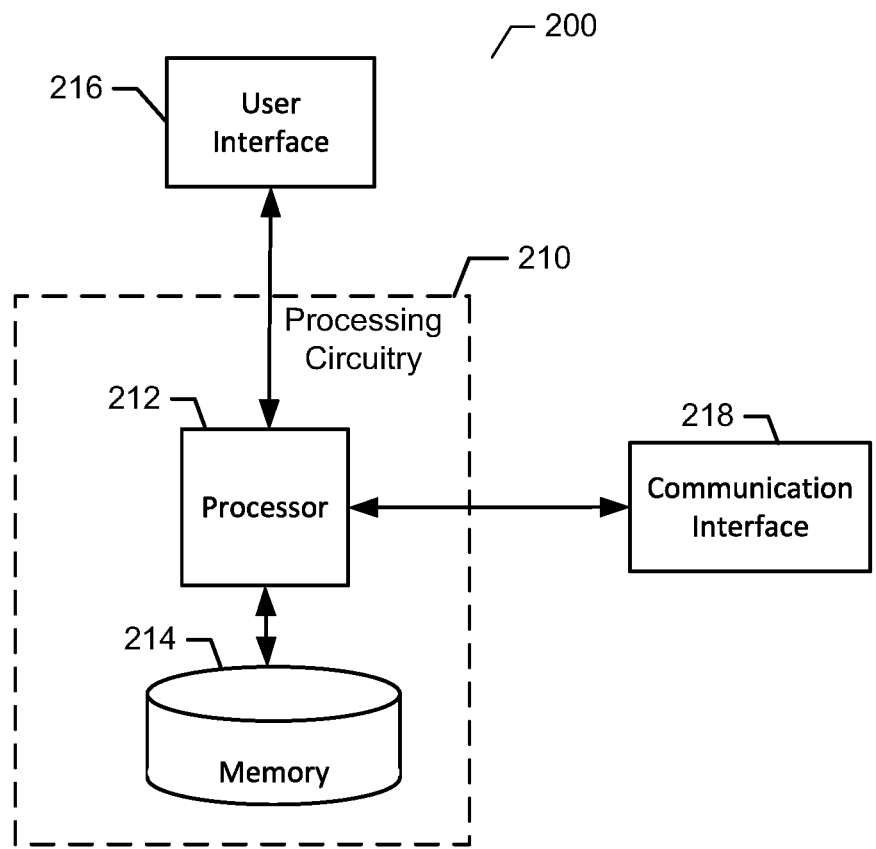
Figure 3:
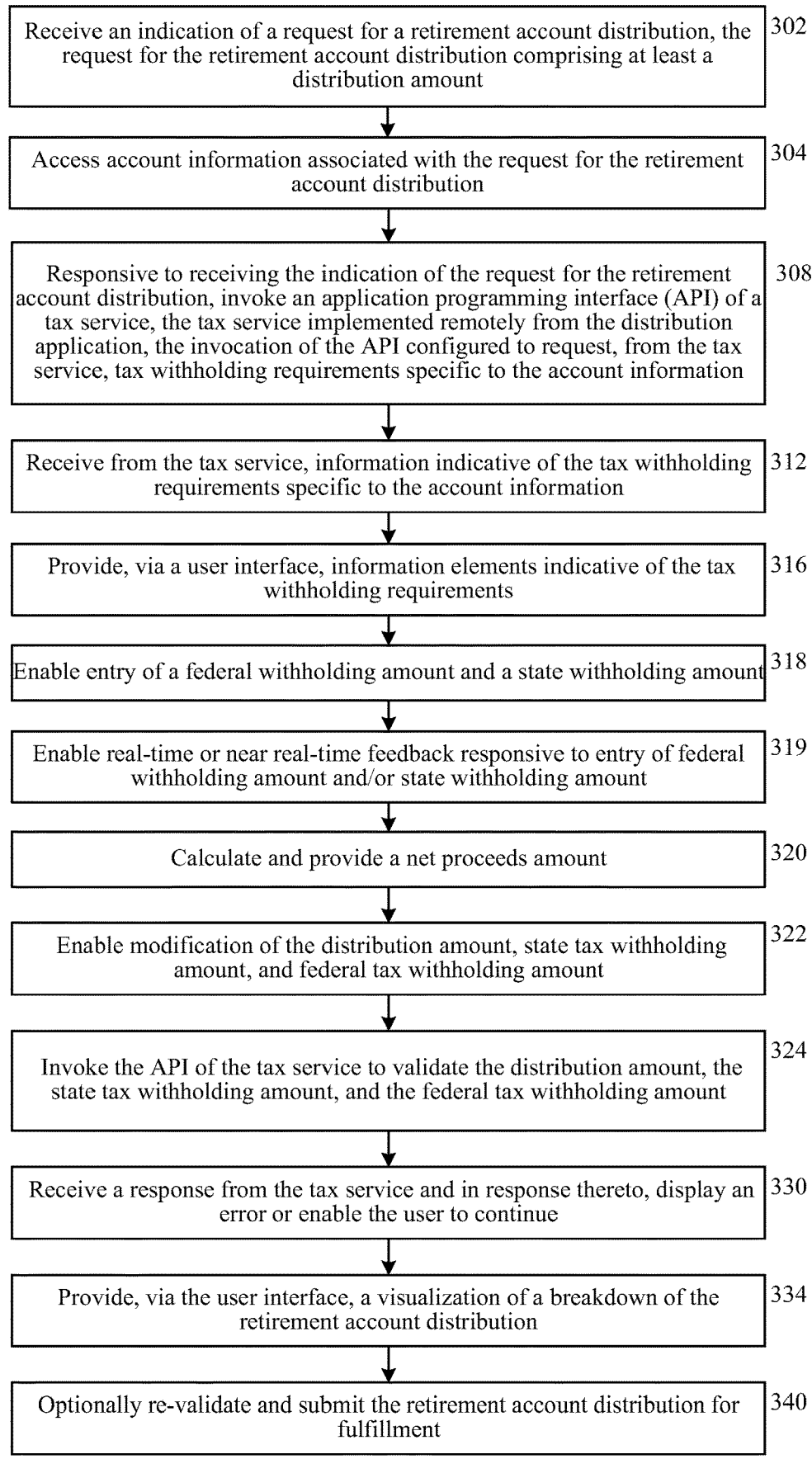
Figure 4:
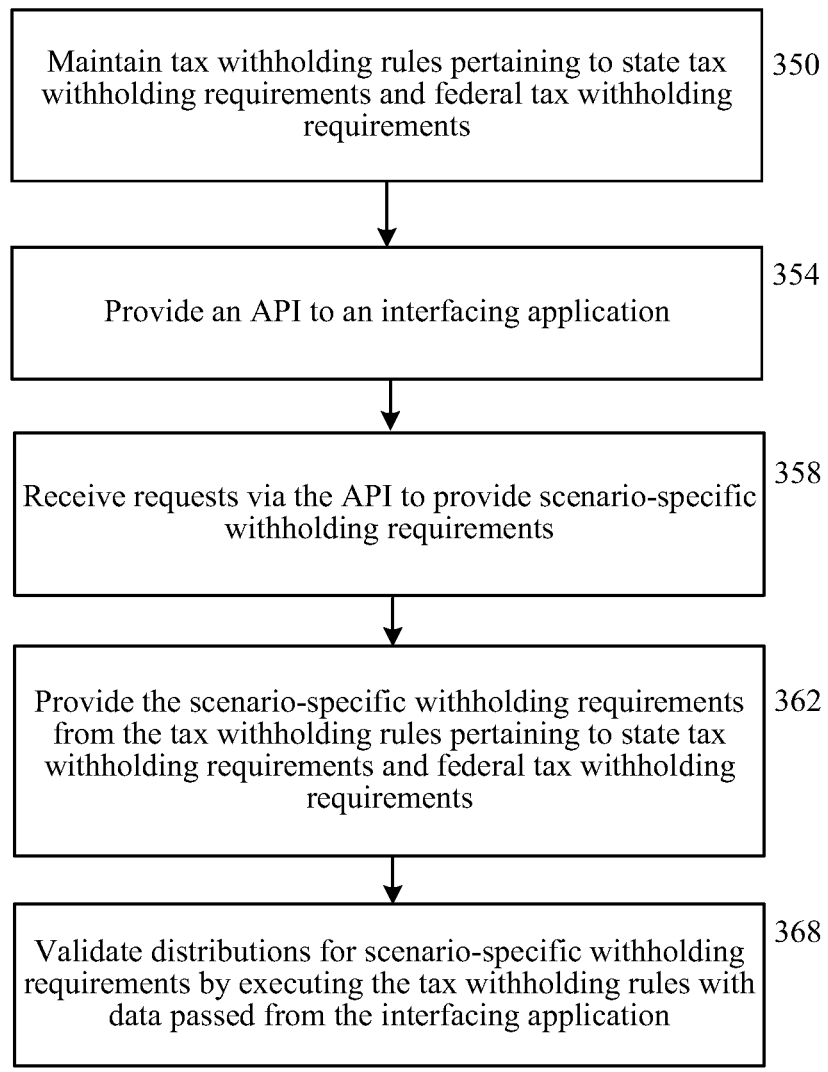

Having thus described embodiments of the invention in general terms, reference will now be made to the accompanying drawings, which are not necessarily drawn to scale, and wherein:

FIG. 1 is an example overview of a system that can be used to practice some example embodiments described herein;

FIG. 2 is an exemplary schematic diagram of an apparatus in accordance with some example embodiments;

FIGS. 3 and 4 are flowcharts of operations that may be performed in accordance with some example embodiments; and FIGS. 5-8, 9A-9I, and 10-14 are exemplary user interfaces that may be provided in accordance with some example embodiments.

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout.

As used herein, where a computing device is described to receive data from another computing device, it will be appreciated that the data may be received directly from the other computing device and/or may be received indirectly via one or more intermediary computing devices, such as, for example, one or more servers, relays, routers, network access points, and/or the like. Similarly, where a computing device is described herein to transmit data to other computing device, it will be appreciated that the data may be sent directly to the other computing device or may be sent to the other computing device via one or more interlinking computing devices, such as, for example, one or more servers, relays, routers, network access points, and/or the like.

FIG. 1 is an overview of a service provider system 100 that can be used to facilitate the processing, validation, routing, modification, and/or submission of electronic distribution transactions, among other transactions facilitated by an associated custodian, financial services provider, and/or the like. According to certain embodiments, the system of FIG. 1 may alert users of tax withholding rules, and/or prevent non-compliant electronic distribution transitions from being fulfilled.

The user device 102 may include any computing device such as a smart phone, laptop, tablet, personal computer laptop and/or the like, and may be used to access the service provider system 100. For example, a user, such as a customer, or other representative acting on behalf of the customer, may utilize a user device 104 to access the distribution application 104 and initiate an electronic distribution transaction or a request therefor.

The distribution application 104 may comprise any computer program code, configured on a memory device and associated with a custodian to facilitate the request for an electronic IRA distribution transaction (such as such requests made via user device 102), submit the transaction for processing, provide feedback to the user device 102, and/or the like. The distribution application 104 may be hosted by a server and/or other computing device, described in further detail hereinafter with respect to FIG. 2. For example, the distribution application 104 may comprise, or integrate with, any number of modules and/or engines such as not but limited to user interaction engine 112, proceeds engine 114, visualization engine 116, account liquidation engine 118, and the transaction engine 120.

The user interaction engine 112 may generate a display for provision on a user interface, such as that of user device 102, that enables user-entry of transaction parameters, and provides feedback to the user regarding instructions and/or other messages. The proceeds engine 114 may be configured to calculate and/or estimate net proceeds that will distributed to the customer net of any fees, withholding, and/or the like, dependent on the parameters provided via the user interface. The visualization engine 116 may be configured to generate a visualization, such as a pie chart or other graphic, illustrating the division of proceeds, fees, withholding amounts, and/or the like. According to certain embodiments, the account liquidation engine 118 may be configured to determine that an account may be liquidated based on a distribution amount, such that appropriate validation and rules may be enforced. The transaction engine 120 may be configured to communicate and/or submit the electronic distribution transactions to various services and/or parties for validation and/or fulfillment. For example, although not illustrated, the transaction engine 120 may communicate such transactions to services configured to facilitate settlement, check remittance, electronic payments, bank wires, and/or the like.

According to certain embodiments, the distribution application 104 and/or any of its associated engines and/or services, may integrate with a tax service 108. In this regard, the tax service 108 may include an application programming interface (API) 142 such that distribution application 104 and/or other application may integrate with the rules repository 150, validation engine 160 and/or other functionality of the tax service 108. In this regard, the API 142 enables the rules repository 150, validation engine 160 and/or other functionality of the tax service 108 to be updated and maintained as needed, without disrupting the functionality of the distribution application 104. For example, in response to changing or new tax legislation, the rules repository 150 and/or validation engine 160 may be modified such that the new or modified rules take effect at a specified date and time, without taking the distribution application 104 offline or requiring a reboot or restart of the distribution application 104 and/or an associated server or computer.

The distribution application 104 may communicate certain proposed parameters of an electronic distribution transaction, such as those entered via the user interface, to the tax service 108 via the API 142. The API 142 may engage the validation engine 160 to process information passed from the distribution application 104 with rules stored in the rules repository 150, such as but not limited to state withholding rules 152, federal withholding rules 154 and/or penalty rules 156. Accordingly, the tax service 108 may function to provide responses to the distribution application 104 indicating whether a proposed electronic distribution transaction complies with relevant rules or laws, what errors need correcting, and/or the like. The tax service 108 may further indicate to the distribution application 104 if a particular proposed electronic distribution transaction is valid and can be fulfilled, and/or if a particular proposed electronic distribution transaction is invalid and needs certain corrections prior to submitting the transaction for fulfillment.

In certain embodiments, the distribution application 104 may communicate with an account information database 164, configured to store account information such as but not limited to the account type, account owner name, residence address, mailing address, age and/or date of birth, account balances, citizen status and/or the like. Although not illustrated, in certain embodiments, an account information service may function to provide integration amongst or between the distribution application 104, tax service 108, and account information database 164. The account information provided by the account information database 164 may be retrieved by the distribution application 104, and passed via the API 142 to the tax service 108. In certain example embodiments, the tax service 108 may retrieve account information from the account information database 164. The account information communicated from the account information database 164 by the distribution application 104 may be utilized by the tax service 108, including the validation engine 160, to validate certain rules, such as tax withholding and/or penalty rules. For example, depending on the account owner's state of residence, date of birth, citizenship status, and/or the like, tax withholding rules may vary. The tax service 108 may therefore utilize information from the customer's account to apply the rules from the rules repository 150. Other information provided by the distribution application 104, such as a distribution amount and/or liquidation indicator may also be utilized by the tax service 108 in validating various rules.

The distribution application 104 may further communicate with a fee service 170 configured by computer program code to receive information regarding an electronic distribution request, to provide information regarding fees that may be applied to the transaction. For example, is a user requests a check distribution, various fees may be applied based on the type of shipping selected. Another fee may be applied for distribution by wire. As another example, an account closing fee may be applied in instances in which the account liquidation engine 118 determines a distribution results in liquidating the account. The proceeds engine 114 may therefore utilize the fee information from the fee service 170 to determine the impact on fees to the customer's proceeds.

The distribution application 104 may be further configured to integrate with the required minimum distribution (RMD) service 180. The required minimum distribution service 180 may comprise computer program code and/or applications configured to process account information, such as a customer's age, and determine required minimum distributions (RMD), related penalties, and/or the like. The distribution application 104 may utilize a response from the RMD service 180 to ensure that a customer requesting an electronic distribution transaction is aware of the RMD rules. For example, the user interaction engine 112 may provide to the user information regarding the user's remaining RMD for a particular tax year.

It will be appreciated that the example system of FIG. 1 is provided merely as an example system for employing embodiments described herein, and that many other variations may be implemented. Some components may be optional, and some embodiments may include further or different components, devices, or elements beyond those illustrated in and described with respect to FIG. 1.

Referring now to FIG. 2, apparatus 200 is a computing device(s) configured for implementing any of the service provider system 100, user device 102, distribution application 104, user interaction engine 112, proceeds engine 114, visualization engine 116, account liquidation engine 118, transaction engine 120, tax service 108, API 142, rules repository 150, validation engine 160, fee service 170, RMD service 180, and/or the like, according to example embodiments.

Apparatus 200 may at least partially or wholly embody the user device 102, service provider system 100, and/or any component thereof. In certain embodiments, apparatus 200 may be implemented as a distributed system that includes any of the components depicted in FIG. 1 and/or associated network(s). For example, tax service 108 may be implemented as a remote service, or on a separate server from distribution application 104. Such distributed implementation may enable updates to the tax service 108 without impacting the integration of distribution application 104 (and/or any other applications or systems integrating with the tax service 108) therewith. In certain embodiments, many other components of FIG. 1 may be distributed accordingly such that multiple instances of an apparatus 200 are utilized.

It should be noted that the components, devices, and elements illustrated in and described with respect to FIG. 2 may not be mandatory and thus some may be omitted in certain embodiments. For example, FIG. 2 illustrates a user interface 216, as described in more detail below, which may be omitted or may be optional in certain components such as the fee service 170, account information database 164, tax service 108, and/or the like. Additionally, some embodiments may include further or different components, devices, or elements beyond those illustrated in and described with respect to FIG. 2.

Continuing with FIG. 2, processing circuitry 210 may be configured to perform actions in accordance with one or more example embodiments disclosed herein. In this regard, the processing circuitry 210 may be configured to perform and/or control performance of one or more functionalities of apparatus 200 in accordance with various example embodiments. The processing circuitry 210 may be configured to perform data processing, application execution, and/or other processing services according to one or more example embodiments. In some embodiments apparatus 200, or a portion(s) or component(s) thereof, such as the processing circuitry 210, may be embodied as or comprise a circuit chip. The circuit chip may constitute means for performing one or more operations for providing the functionalities described herein.

In some example embodiments, the processing circuitry 210 may include a processor 212, and in some embodiments, such as that illustrated in FIG. 2, may further include memory 214. The processing circuitry 210 may be in communication with or otherwise control a user interface 216, and/or a communication interface 218. As such, the processing circuitry 210 may be embodied as a circuit chip (e.g., an integrated circuit chip) configured (e.g., with hardware, software, or a combination of hardware and software) to perform operations described herein.

The processor 212 may be embodied in a number of different ways. For example, the processor 212 may be embodied as various processing means such as one or more of a microprocessor or other processing element, a coprocessor, a controller, or various other computing or processing devices including integrated circuits such as, for example, an ASIC (application specific integrated circuit), an FPGA (field programmable gate array), or the like. Although illustrated as a single processor, it will be appreciated that the processor 212 may comprise a plurality of processors. The plurality of processors may be in operative communication with each other and may be collectively configured to perform one or more functionalities of apparatus 200 as described herein. The plurality of processors may be embodied on a single computing device or distributed across a plurality of computing devices collectively configured to function as service provider system 100, any of the components thereof, and/or apparatus 200. In some example embodiments, the processor 212 may be configured to execute instructions stored in the memory 214 or otherwise accessible to the processor 212. As such, whether configured by hardware or by a combination of hardware and software, the processor 212 may represent an entity (e.g., physically embodied in circuitry—in the form of processing circuitry 210) capable of performing operations according to embodiments of the present invention while configured accordingly. Thus, for example, when the processor 212 is embodied as an ASIC, FPGA, or the like, the processor 212 may be specifically configured hardware for conducting the operations described herein. Alternatively, as another example, when the processor 212 is embodied as an executor of software instructions, the instructions may specifically configure the processor 212 to perform one or more operations described herein.

In some example embodiments, the memory 214 may include one or more non-transitory memory devices such as, for example, volatile and/or non-volatile memory that may be either fixed or removable. In this regard, the memory 214 may comprise a non-transitory computer-readable storage medium. It will be appreciated that while the memory 214 is illustrated as a single memory, the memory 214 may comprise a plurality of memories. The plurality of memories may be embodied on a single computing device or may be distributed across a plurality of computing devices. The memory 214 may be configured to store information, data, applications, computer program code, instructions and/or the like for enabling apparatus 200 to carry out various functions in accordance with one or more example embodiments. For example, when apparatus 200 is implemented as distribution application 104 and/or tax service 108, memory 214 may be configured to store computer program code for performing corresponding functions thereof, as described herein according to example embodiments.

In some embodiments, the memory 214 may include one or more databases that may store a variety of files, contents, or data sets. For example, memory 214 may comprise account information database 164. The memory 214 may also be configured for storing transactional information such as electronic distribution transactions. As such, the memory 214 may be modified as described herein, to reformat electronic distribution transactions with additional information received, determined and/or generated according to example embodiments. For example, a request for electronic distribution transactions may be flagged as non-compliant, rejected, or denied based on certain rule violations described in further detail herein, and/or an electronic distribution transaction may be modified on memory 214 to indicate the transaction has been fulfilled, and/or validated and submitted for fulfillment.

The memory 214 may be further configured to buffer input data for processing by the processor 212. Additionally or alternatively, the memory 214 may be configured to store instructions for execution by the processor 212. Among the contents of the memory 214, applications may be stored for execution by the processor 212 to carry out the functionality associated with each respective application. In some cases, the memory 214 may be in communication with one or more of the processor 212, user interface 216, and/or communication interface 218, for passing information among components of apparatus 200.

The optional user interface 216 may be in communication with the processing circuitry 210 to receive an indication of a user input at the user interface 216 and/or to provide an audible, visual, mechanical, or other output to the user. As such, the user interface 216 may include, for example, a keyboard, a mouse, a display, a touch screen display, a microphone, a speaker, and/or other input/output mechanisms. As such, in embodiments in which apparatus 200 implemented as the user device 102, the user interface 216 may, in some example embodiments, provide means for user entry of details relating to an electronic distribution transaction, and/or the like. The user interface 216 may be further configured to display or provide tax withholding information, such as when apparatus 200 is implemented as a user device 102. In some example embodiments, aspects of user interface 216 may be limited or the user interface 216 may not be present.

The communication interface 218 may include one or more interface mechanisms for enabling communication with other devices and/or networks. In some cases, the communication interface 218 may be any means such as a device or circuitry embodied in either hardware, or a combination of hardware and software that is configured to receive and/or transmit data from/to a network and/or any other device or module in communication with the processing circuitry 210. By way of example, the communication interface 218 may be configured to enable communication amongst any of the components of the service provider system 100, user device 102, and/or apparatus 200 over a network. Accordingly, the communication interface 218 may, for example, include supporting hardware and/or software for enabling wireless and/or wireline communications via cable, digital subscriber line (DSL), universal serial bus (USB), Ethernet, or other methods.

A network, such as the network in which any of the systems of FIG. 1 or components thereof or components described herein may operate may include a local area network, the Internet, any other form of a network, or any combination thereof, including proprietary private and semi-private networks and public networks. The network may comprise a wired network and/or a wireless network (e.g., a cellular network, wireless local area network, wireless wide area network, some combination thereof, and/or the like).

Having now described an example apparatus for implementing example embodiments, FIG. 3 is a flowchart illustrating example operations of an apparatus 200, according to some example embodiments. The operations of FIG. 3 may be performed by apparatus 200, such as with the service provider system 100, and/or the like.

As shown by operation 302, apparatus 200 may include means, such as processor 212, memory 214, communication interface 218, and/or the like, for receiving an indication of a request for a retirement account distribution, the request for the retirement account distribution comprising at least a distribution amount. The request may be a request for an electronic distribution transaction provided via the distribution application 104. For example, a user interface(s) generated by the distribution application 104 and/or user interaction engine 112, may be provided for display via user device 102. The information associated with the request for the electronic distribution transaction may be provided via any number of user interface screens, such as the exemplary user interface displays of FIGS. 5-8, 9A-9I, and 10-14. It will be appreciated that the example displays illustrated may be consolidated or further divided in a variety of configurations.

According to example embodiments, the information included in a request for a retirement account distribution may include, but is not limited to, an account type and/or number, such as selected in dropdown 500 of FIG. 5. In this regard, the distribution application 104 may retrieve a list of accounts associated with an authenticated or otherwise authorized (e.g., logged on) user. The selection in the dropdown may indicate an account type (e.g., Traditional IRA, Self Employed Pension Plan (SEP) IRA) and/or an account number.

In certain embodiments, if the account balances indicate that the amount of cash is less than the total account value, example embodiments may prompt the user to indicate if they intend to withdraw more than the available cash balance of the account, as in area 502. In some embodiments, this option may appear only for advisors, or others specific types of users. If a user selects "Yes," example embodiments may initiate other processes to initiate a trade. In certain embodiments, such as those in which the logged on user is the account owner, example embodiments may not provide the prompt in area 502.

Example embodiments may prompt the user to indicate whether the distribution is a one-time distribution or a recurring distribution, in area 504. If the user selects "One time," the distribution may be scheduled as a one-time occurrence. If the user selects "Recurring," the user may be prompted to enter further details regarding the frequency of recurrence, and/or the like. Example embodiments may then schedule recurring transactions, accordingly, such as when the transaction is finalized and submitted for fulfillment as described in further detail below.

Figure 6:
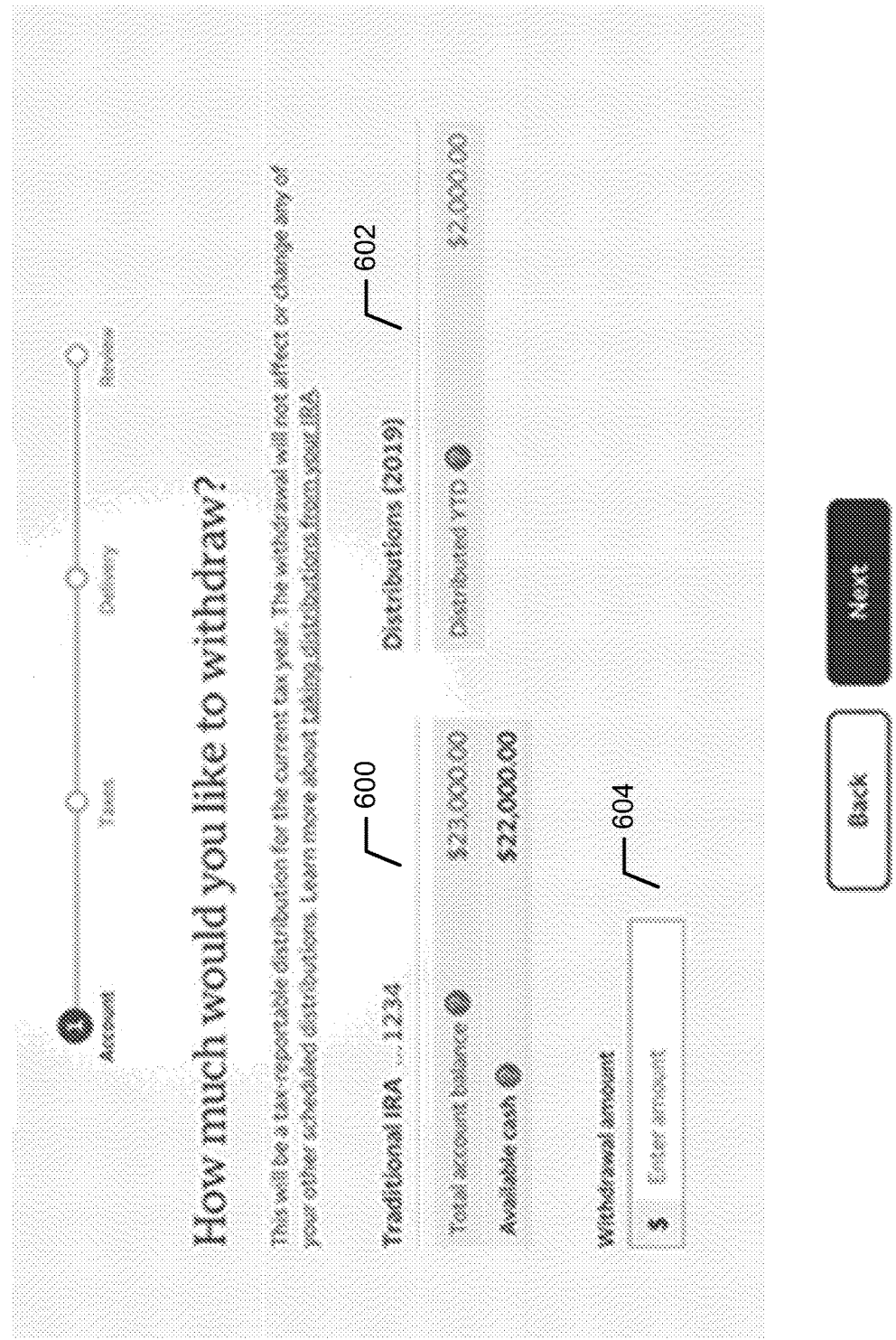
Figure 7:
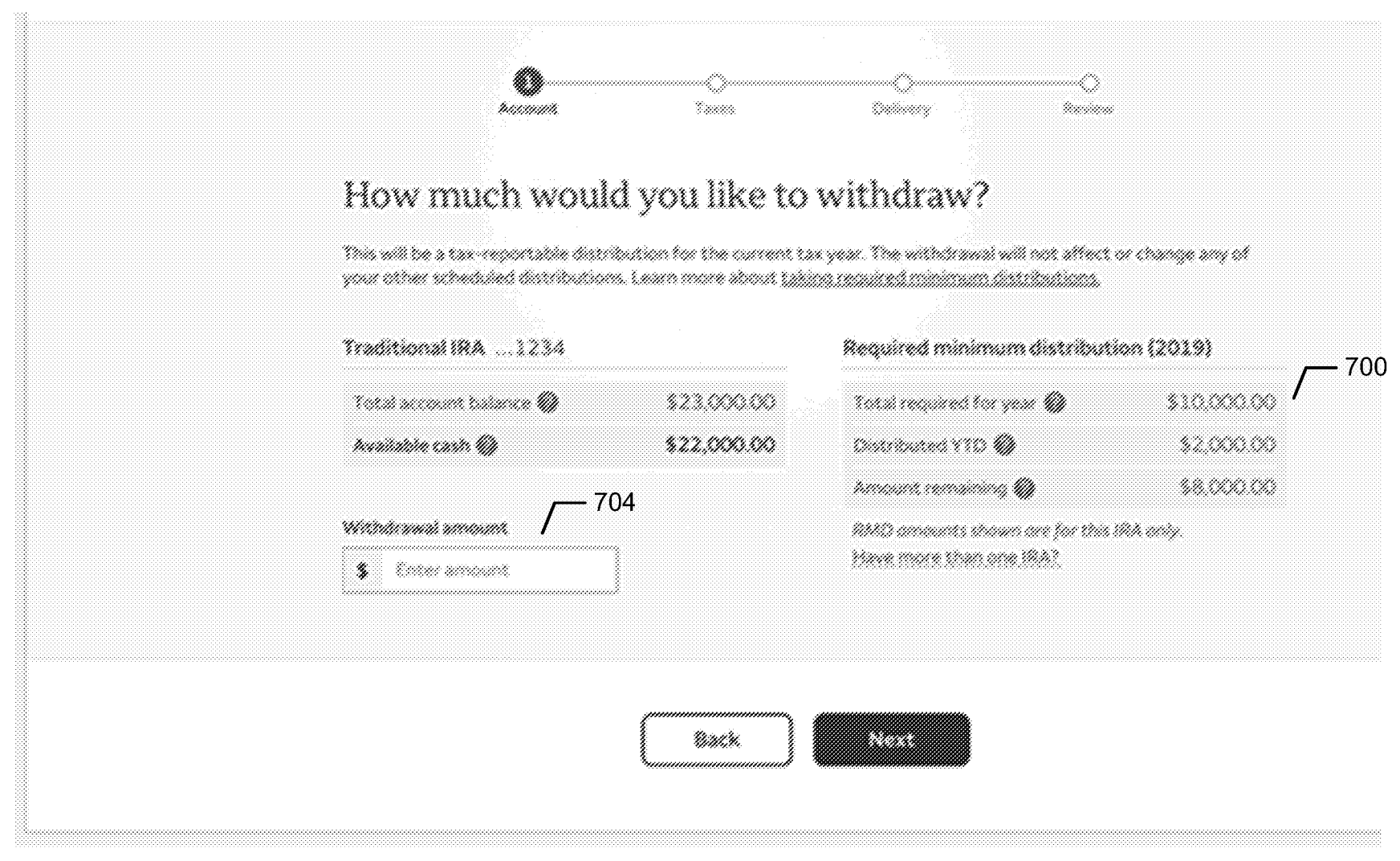

The distribution application 104 and/or user interaction engine 112 may further provide information regarding current total account balances and available cash (FIG. 6, area 600). Historical distributions, such as for the current calendar year, may be provided in area 602. As illustrated in FIG. 7, area 700, the distribution application 104 may further provide information regarding remaining total RMD for the year, an amount distributed year to date (YTD), and an amount RMD remaining, such as provided by RMD service 180. In area 604 (and/or 704), the user may enter the desired withdrawal amount, or distribution amount. The user interaction engine 112 may receive data entered by the user and populate an electronic distribution transaction, in memory 214, accordingly.

As shown by operation 304, apparatus 200 may include means, such as processor 212, memory 214, communication interface 218, and/or the like, for accessing account information associated with the request for the retirement account distribution. It will be appreciated that the account information associated with the authenticated or authorized customer (e.g., logged on user, or customer for which the logged on user has transactional authorization) may be retrieved in a variety of ways. As one example, all available account information related to the customer may be retrieved and cached on memory 214, when the user logs onto the service provider system 100 and/or distribution application 104 (and/or indicates a customer for which the user has transactional authorization). As another example, all the account information, or relevant account information may be accessed when the user initially accesses the user interface for requesting the electronic distribution transaction, such as the user interface of FIG. 5 and/or account information relating to a selected account may be retrieved. In this regard, the accounts registered to the associated customer may be populated for display and selection, such as in dropdown 500. In addition to the listing of accounts and corresponding account types, example embodiments may retrieve additional account information, such as but not limited to a residential address and/or state of residence, citizenship, date of birth (DOB), age, marital status, and/or the like.

As shown by operation 308, apparatus 200 may include means, such as processor 212, memory 214, communication interface 218, and/or the like, for, responsive to receiving the indication of the request for the retirement account distribution, invoking an API, such as API 142, of a tax service, such as tax service 108. According to certain embodiments, the invocation of the API may be configured to request, from the tax service 108, tax withholding requirements specific to the account information. For example, the API 142 may provide a function to the distribution application 104 which populates parameters, such as but not limited to, state of residency, citizenship status, age, and/or the like. In this regard, the distribution application 104 may manipulate or further process data received from the account information database 164, such as with respect to operation 304, to invoke the API 142.

For example, the distribution application 104 may parse an address provided by the account information database 164 to provide to the tax service 108 the customer's state of residence. In an example in which the customer's address is determined to be outside the United States, the distribution application 104 may generate a flag or indicator indicating expatriate status. As another example, the distribution application 104 may utilize the customer's DOB to determine a current age of the customer.

It will be appreciated that the invocation of the API 142 by the distribution application 104 may require a variety of information regarding the customer and/or electronic redemption transaction. In certain embodiments, the API 142 may require any information that may be required in future tax law legislation, to limit or reduce impact to the distribution application 104 in instances in which the rules repository 150, or other functionality of the tax service 108, is updated.

It will be appreciated that the distribution application 104 may be further configured to generate certain parameters for passing to the API 142, such as those not available by the account information database 164. For example, in certain embodiments, the account liquidation engine 118 may detect that the redemption amount requested via the user interface 216 equals the total account balance, such that the account would be liquidated in response to fulfillment of the distribution. In this regard, the account liquidation engine 118 and/or distribution application 104 may generate, or populate, a liquidation flag or indicator to be provided to the tax service 108 via the API 142. For example, the liquidation flag may be a Boolean type field configured to indicate whether the electronic distribution transaction will result in liquidation of the account. According to certain embodiments, the tax withholding rules enforced by the tax service 108, described in further detail below, may vary depending on whether the account is being liquidated. For example, later in the process, upon identification or reception of the liquidation flag, the system may identify or determine a particular law, which law or laws of a set of laws, or the like, to consider, apply, make known via the display, and/or the like.

In response to operation 308, including invocation of the tax service 108, the tax service may process the request passed via the API 142, and provide a response to the distribution application 104. The processing by the tax service 108 is described in further detail with respect to FIG. 4.

As shown by operation 312, apparatus 200 may include means, such as processor 212, memory 214, communication interface 218, and/or the like, for receiving, from tax service 108, information indicative of the tax withholding requirements specific to the account information and/or transaction information. In this regard, the account information and/or transaction information utilized by the tax service 108 to determine tax withholding requirements may include any of the information communicated via the API 142 including the account information (e.g., citizenship status, age) and/or transaction information (e.g., liquidation flag). The response received from the tax service 108 may include a variety of information in various formats. For example, the response may include an object or data structure representing federal tax withholding requirements, and/or an object or data structure representing state tax withholding requirements. The response may therefore include a percentage number that represents the minimum federal withholding rate required by law, and/or a percentage number representing the minimum state withholding rate. As another example, the response may include a description of withholding requirements, such as for example state withholding requirements that describe more complex withholding requirements in comparison to a minimum rate to be withheld. For example, responses including state withholding rules for certain states may indicate a minimum rate enforced if any amount is withhold, but that withholding is optional. As another example, a minimum state withholding amount may be expressed as a percentage rate of the federal amount withheld.

According to certain embodiments, one or more Boolean flags may be provided in the response from the tax service 108. According to certain embodiments, a field implemented a Boolean flag or other similar data elements may indicate whether the custodian is permitted to withhold taxes for the particular state in which the customer resides. Additional examples of a field implemented with a Boolean flag or other similar data elements may indicate whether a customer may opt out of federal and/or state withholding.

In certain embodiments, a supplemental field(s) or object(s) may be returned in the response from the tax service 108 utilized for state-specific scenarios, age-specific scenarios, and/or the like. For example, as described below, certain states may require acknowledgement of a disclosure, such as a disclosure specific to tax withholding rules for the state. The object returned in the response from the tax service 108 may therefore include the textual content of the disclosure to display to the user, and any other fields describing information to be collected, an indication of whether such fields are optional and/or required, and/or the like. Such information is described as supplemental as responses in certain scenarios may not include any supplemental information. The supplemental information may be tailored to provide any additional information and/or enforce additional requirements, such as in response to changing tax code. Such information and rules may be added to or modified in the tax service 108, as described in further detail below.

As yet another example, certain embodiments may return an indicator indicating whether early withdrawal penalties may apply, and/or the percentage rate of the penalty.

More examples regarding the response returned from the tax service 108 are described in further detail hereinafter with reference to FIGS. 8 and 9A-9I, and operation 316.

Figure 8:
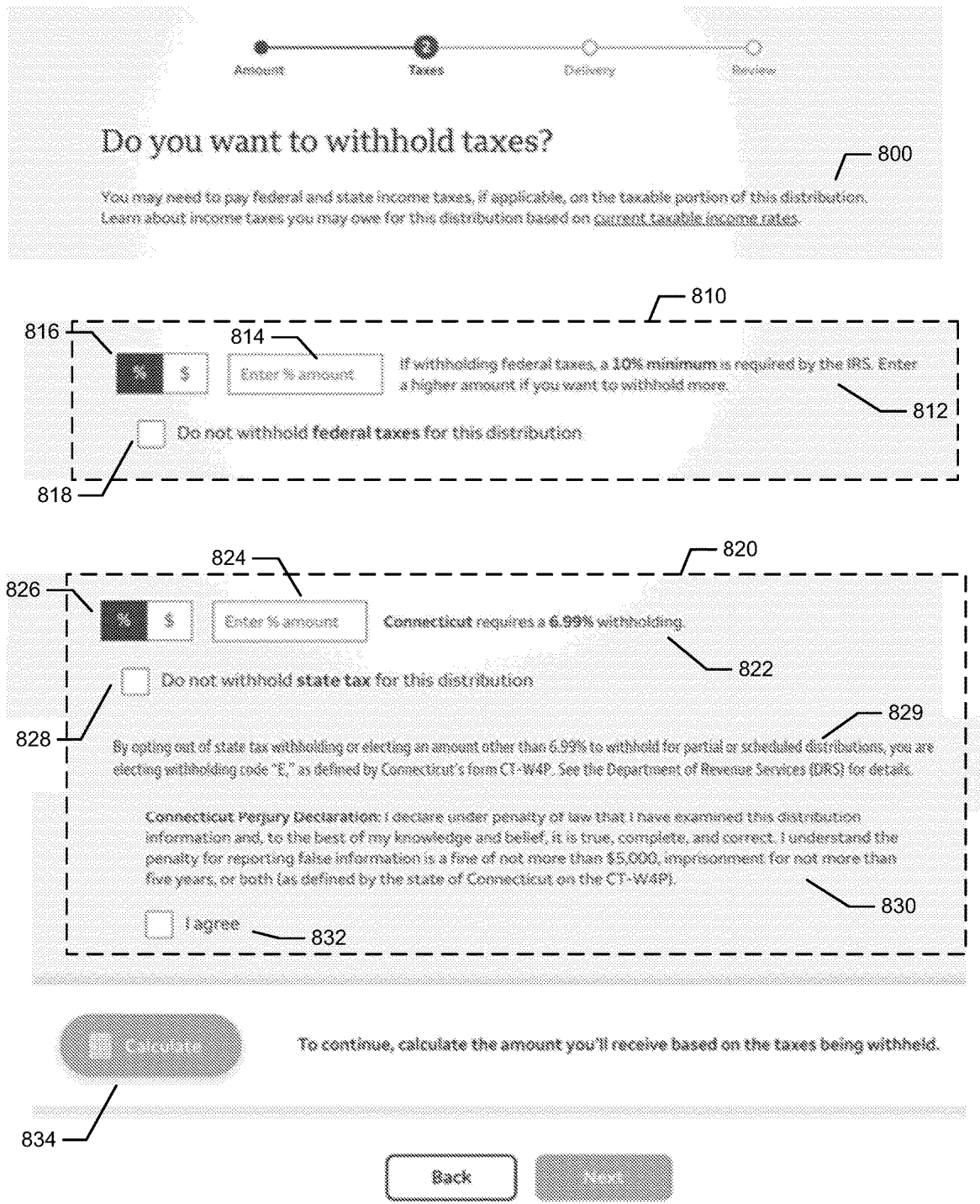

As shown by operation 316, apparatus 200 may include means, such as processor 212, memory 214, user interface 216, communication interface 218, and/or the like, for providing, via the user interface, user interface elements indicative of the tax withholding requirements. FIG. 8 illustrates an example display configured to provide tax withholding information, and to collect tax withholding amounts, such as a federal withholding amount, and/or state withholding amount, from the user. Example embodiments may generate a user interface element 800 that provides information relating to withholding requirements and/or a link to other information, such as taxable income rates.

Area 810, encompassed by a dashed line, includes user interface elements dynamically generated by example embodiments, such as with the user interaction engine 112, to convey federal tax withholding information and collect a federal tax withholding amount. The content 812 may be the content returned from the tax service 108 that describes the federal tax withholding requirements. The content may describe the current federal tax withholding requirements maintained by the tax service 108 (described in further detail below). The user may enter an amount in 814 and toggle between indicating entry of percentage or dollar amounts with indicator 816. An optional indicator 818 and corresponding description may be provided, dependent on whether the response from the tax service 108 indicates a customer may opt out of federal tax withholding. If a Boolean value, or other similar data element indicates the customer may opt out, the option or indicator 818 is provided to allow the user to opt out. If a Boolean value, or other similar data element, indicates the customer may not opt out, the indicator 818 may not be shown. If the opt out indicator 818 is selected, example embodiments may set the withholding amount to 0.

Area 820, encompassed by a dashed line, includes user interface elements dynamically generated by example embodiments, such as with the user interaction engine 112, to convey state tax withholding information and to collect a state tax withholding amount. The content 822 may be the content returned from the tax service 108 that describes the state tax withholding requirements, depending on the state of residence determined and/or generated by the distribution application 104 and passed to the API 142. The content 822 may describe the current state tax withholding requirements maintained by the tax service 108 for the state (described in further detail below). The user may enter an amount in 824 and toggle between indicating entry of percentage or dollar amounts with indicator 826. An optional indicator 828 and corresponding description may be provided, dependent on whether the response from the tax service 108 indicates a customer may opt out of state tax withholding. If a Boolean value, or other similar data element indicates the customer may opt out, the option or indicator 828 is provided to allow the user to opt out. If a Boolean value, or other similar data element, indicates the customer may not opt out, the indicator 828 may not be shown. If the opt out indicator 828 is selected, example embodiments may set the withholding amount to 0. An additional content 829 may be provided describing the opt out indicator. In certain embodiments, content, such as content 829 may be dynamically displayed responsive to selection of an indicator, such as the indication 828. Accordingly, the content, such as content 829 may be hidden responsive to deselection of an indicator. In certain embodiments, additional content, such as content 829, may be displayed regardless of any other user input or selection, or such content may not be present for a particular state, and therefore may not be displayed.

As introduced above, the response (e.g. the information indicative of the tax withholding requirements) may include supplementation information and/or requirements, such as but not limited to state-specific withholding information and/or requirements, which may be included for only certain states or scenarios, but not others. Content 830 and corresponding indicator 832 are examples of user interface elements associated with the supplemental withholding information. Content 830 provides an example perjury declaration that is specific to the state of Connecticut, and therefore is only provided by the tax service 108 when the customer is a resident of Connecticut. The indicator 832 is provided for the user to acknowledge the declaration, and may be required to be selected for the transaction to be validated and/or fulfilled, as described in further detail herein.

As exemplified by FIG. 8, and according to additional examples described hereinafter, example embodiments dynamically generate the user interface elements provided for display, dependent on the information indicated by the tax withholding requirements received from the tax service 108, such as in operation 312. FIGS. 9A-9I provide example variations of user elements that may be provided according to example embodiments, and according to the response provided by the tax service 108. Area 820 of FIG. 8 may therefore be modified to incorporate any of the example displays, or display portions, of FIGS. 9A-9I.

Figure 9A:
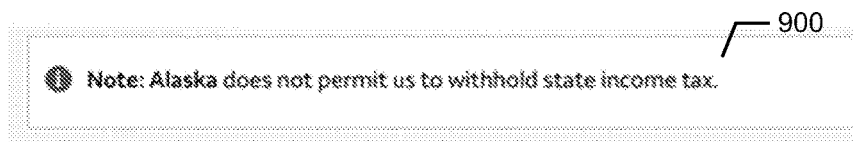

For example, FIG. 9A includes content 900 indicating Alaska does not permit state income tax withholding. An example associated response from the tax service 108 may include an indicator that state tax withholding is not permitted, and/or the content 900. Example embodiments process the response to generate the user interface elements(s) such that no entry of state tax withholding is permitted. Associated user interface elements, such as input field 824 and/or toggle 826 may therefore be removed, hidden, or prevented from being displayed.

Figure 9B:
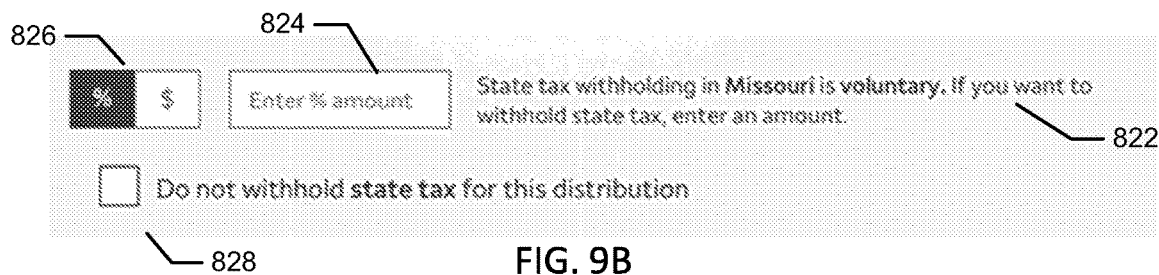
Figure 9C:
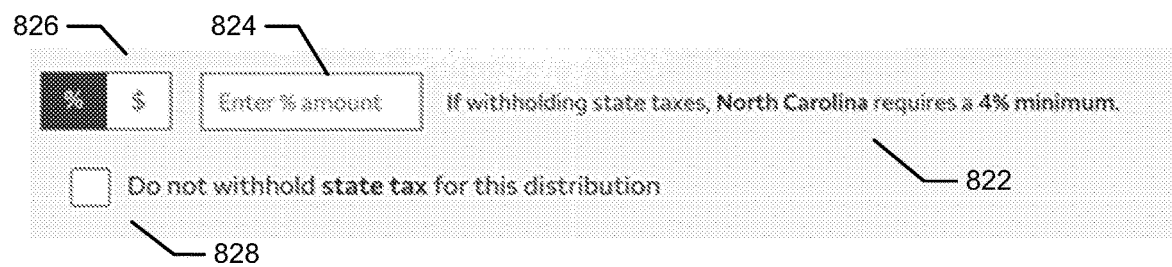

FIGS. 9B and 9C exemplify user interface elements generated based on responses from the tax service 108 for which the account holder resides in Missouri, and North Carolina respectively. Although different rules may be enforced for the minimum withholding amounts (described in further detail below), both states (and therefore the user interface elements of FIGS. 9B and 9C) allow state tax withholding, but also allow the customer to opt out of state tax withholding (indicator 828).

Figure 9D:
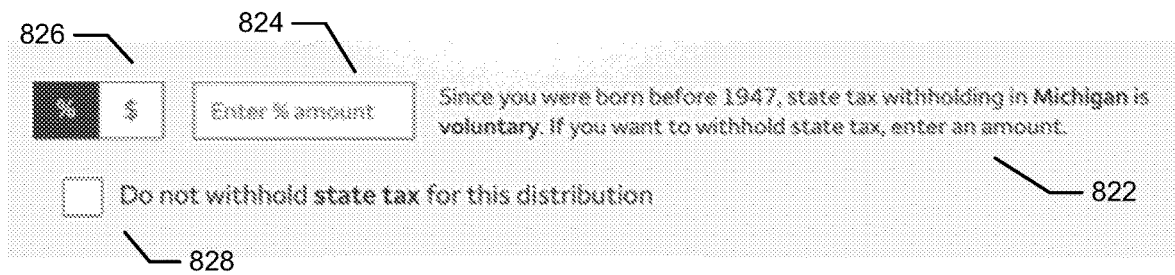
Figure 9E:
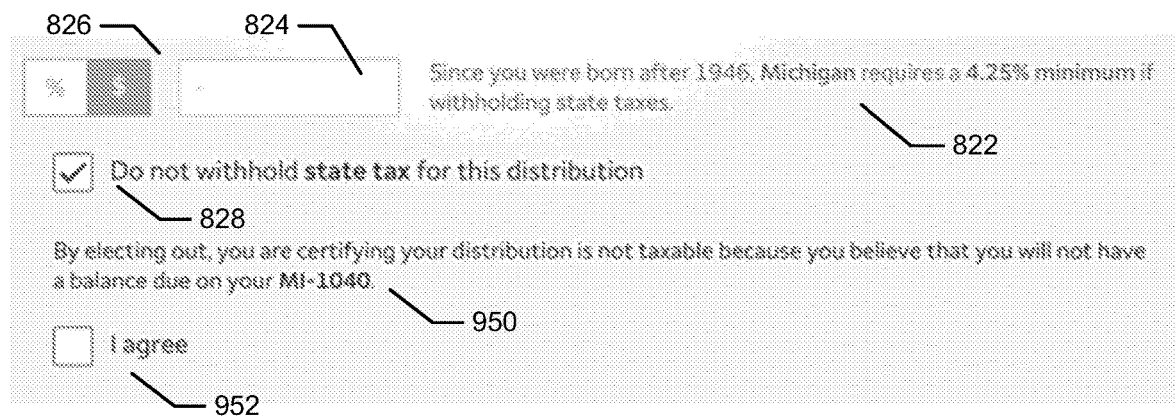
Figure 10:
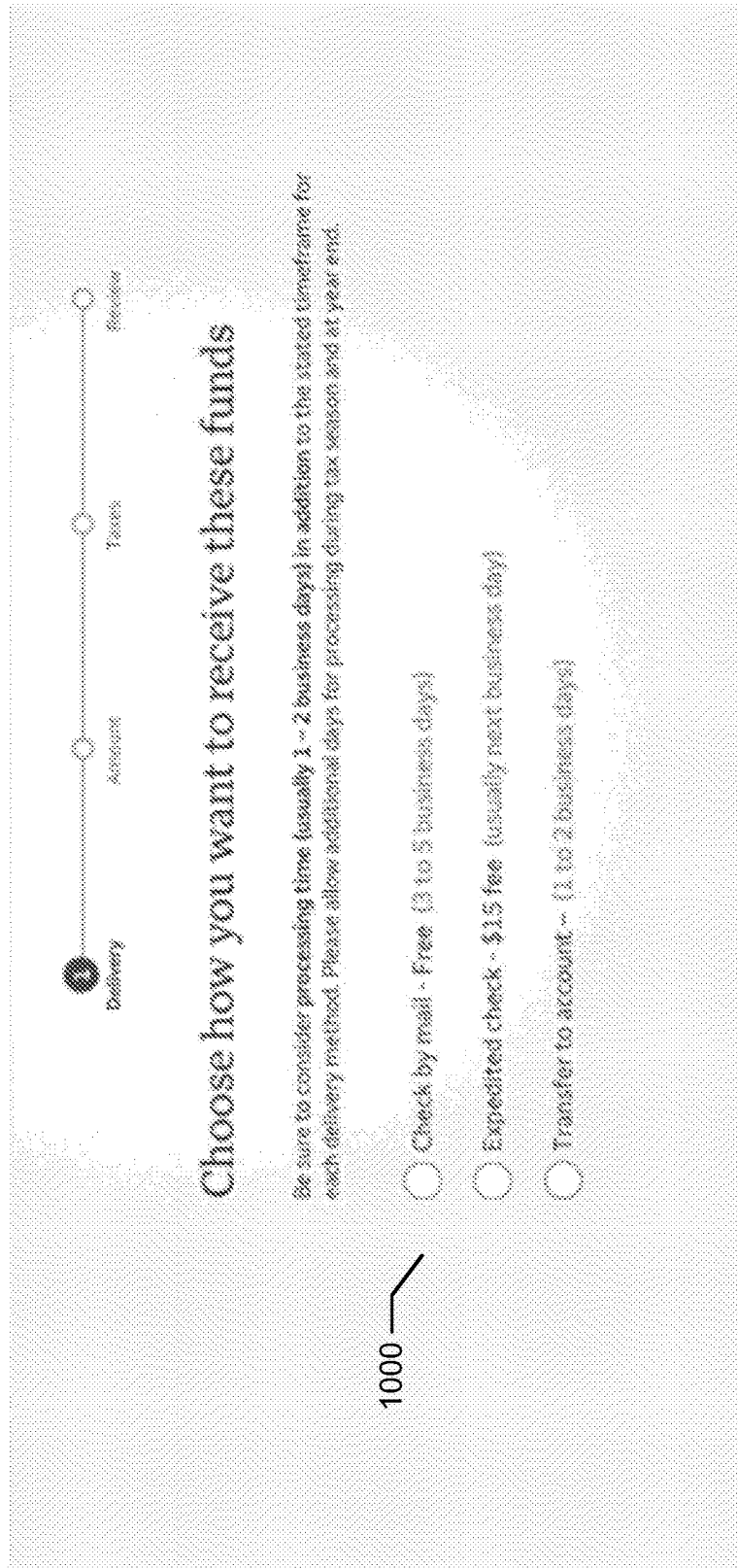
Figure 11:
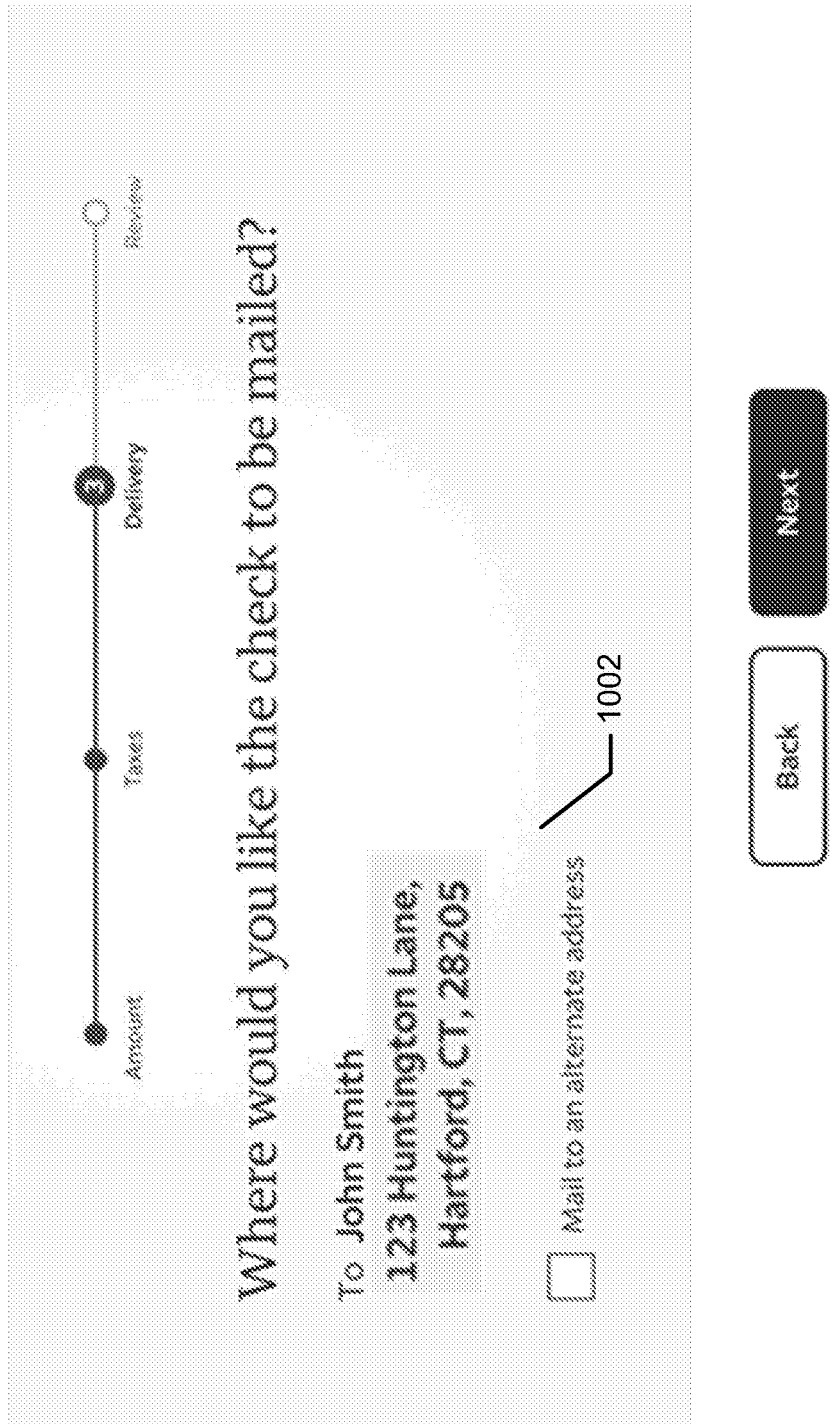

Content 822, as shown in FIGS. 9B-9H, describes the state withholding requirements and/or allowances for the particular state of the account owner, as returned by the tax service 108. In such examples permitting state tax withholding, the input box 824 and corresponding toggle 826 may also be provided. According to certain embodiments, the distribution application 104 may be configured to show the optional indicator 828 in scenarios in which the tax service 108 indicates that the customer may opt out of state tax withholding. In certain scenarios, example embodiments set the state tax withholding amount to 0, and do not show any further content relating to state tax withholding. However, in some examples, example embodiments set the state tax withholding amount to 0, and dynamically generate additional user interface elements. For example, as shown in FIG. 9E, in response to user selection of indicator 828, an additional content 950 is provided providing a certification, and an additional indicator 952 is provided for the user to acknowledge compliance with the certification. Accordingly, during rule validation described in further detail below, the distribution application 104 may require selection of the indicator 952 in order to fulfill the request for redemption.

FIGS. 9D and 9E exemplify additional dynamic functionality provided by the distribution application 104 based on information provided by the tax service 108. In certain embodiments, the tax service 108 may utilize the DOB of the account holder in determining the response to provide to the distribution application 104. As shown by 822, the content may be dynamic depending on the DOB relative to the year 1947. Accordingly, and as discussed below, the validation process may enforce the different rules applicable in the different scenarios.

FIGS. 9F, 9G and 9H provide additional exemplary user interface elements generated according to example embodiments, and comprising user interface elements 822, 824, 826 and 826. The content 822 is dynamic in each of FIGS. 9F, 9G and 9H to account for the varying state tax withholding requirements of the respective states Nebraska, Vermont, and California.

It will be appreciated that the exemplary user interfaces and/or user interface elements of FIG. 8, and FIGS. 9A-9H are provided merely as examples, and that any variation of user interface elements may be generated by example embodiments according to the information and/or requirements provided by the tax service 108, and based on the information passed thereto by the distribution application 104 via API 142.

Moreover, according to certain embodiments, some components may present on a user interface while others may be optional or removed. For example, according to certain embodiments and a scenario in which the customer is an expatriate residing outside the United States, the user interface display of FIG. 8 may include an area 810 relating to federal tax withholding, but the area 820 relating to state tax withholding may be omitted. Additionally or alternatively, example embodiments may display to expatriates a treaty tax rate according to the customer's country of residence (provided by and/or validated by the tax service 108), if applicable. Certain embodiments may also validate rules pertaining to expatriates, and display and related errors as described in further detail below.

Utilizing at least the user interface elements described above with respect to FIGS. 8 and 9A-9H, as shown by operation 318, apparatus 200 may include means, such as processor 212, memory 214, user interface 216, communication interface 218, and/or the like, for enabling entry of a federal withholding amount and/or state tax withholding amount. The user may provide the entry in dollars or percentage. According to certain embodiments, the distribution application 104 may be configured to convert an entered amount to a dollar amount or percentage.

As shown by operation 319, apparatus 200 may include means, such as processor 212, memory 214, user interface 216, communication interface 218, and/or the like, for enabling real-time or near real-time feedback responsive to entry of the federal withholding amount and/or state withholding amount. The term near real-time is referenced to account for short delays in processing time that may occur. In this regard, it will be appreciated that any of the operations described herein, such as but not limited to those provided in the flowcharts of FIGS. 3 and/or 4, may occur in real-time or near real-time in responsive to the user entering data, such as but not limited to a federal withholding amount and/or a state withholding amount. In this regard, user interface displays provided by example embodiments, may include specifically configured user interface components, such as input fields 814 and 824, for example, to trigger specific functions responsive to user input, such as the functions and/or operations outlined in the flowcharts of FIGS. 3 and/or 4. Additionally or alternatively, certain required disclosures or other agreements may be provided in response to user-selection of a checkbox or acknowledgement, such as 828. In this regard, certain operations described herein may occur in real-time or near real-time once a user input is provided. In any event, the user interface displays provided by example embodiments may provide interactive components configured for real-time or near real-time feedback, thereby improving upon any prior distribution applications that may stop similar online transactions and force the user to call the custodian to obtain withholding information.

As shown by operation 320, apparatus 200 may include means, such as processor 212, memory 214, user interface 216, communication interface 218, and/or the like, for calculating and providing a net proceeds amount. Example embodiments may provide a user interface element for initiating calculation of net proceeds dependent on the entered withholding amounts at 814 and 824. The results may be displayed in a layer responsive to selection of the button 834, or may be displayed on a display such as that of FIG. 8, responsive to user input in either or both fields 814 and 824. In any event, example embodiments may provide net proceeds calculations, such is provided in FIG. 9I. The results 990 indicate the net proceeds that may be calculated by the proceeds engine 114. For example, the net proceeds may be calculated as the distribution amount entered at 604 minus the federal withholding amount at 814, minus the state withholding amount at 824, minus any penalties, such as early withdrawal penalties, to be withheld.

In certain embodiments and scenarios, the calculated net proceeds after consideration of federal and state withholding may prompt a user to edit the distribution amount, federal tax withholding amount and/or state tax withholding amount such that the net proceeds better meet their needs. Accordingly, as shown by operation 322 of FIG. 3, apparatus 200 may include means, such as processor 212, memory 214, user interface 216, communication interface 218, and/or the like, for enabling modification of the distribution amount, state tax withholding amount and/or federal tax withholding amount. Accordingly, the user may modify entered amounts, including but not limited to the distribution amount, state tax withholding amount and/or federal tax withholding amount, and/or navigate between pages to modify such amounts.

According to certain embodiments, the information may be validated as the user enters amounts, and/or when a user selects a button labeled "continue," "submit," or other similar user interface element. In this regard, as shown by operation 324, apparatus 200 may include means, such as processor 212, memory 214, communication interface 218, and/or the like, for invoking the API of the tax service 108 to validate the distribution amount, the state withholding amount, and the federal tax withholding amount. In this regard, the distribution amount, state tax withholding amount, and federal tax withholding amount entered by a user may be transmitted from the distribution application 104 to the tax service 108 via the API 142. Additionally, other information relating to the account and/or specific scenario, such as that described with respect to operation 308, may be passed via the API 142. The transaction engine 120, for example, may be configured to populate the information required by the API 142 for validation.

Accordingly, the tax service 108 may validate the information, such as with the validation engine 160 and/or rules repository 150, as described in further detail below with respect to FIG. 4, and provide a response to the distribution application 104 regarding the validation.

In operation 330, apparatus 200 may include means, such as processor 212, memory 214, communication interface 218, and/or the like, for receiving a response from the tax service 108, and in response thereto, displaying an error or enabling the user to continue. In certain embodiments, a variety of outcomes may occur in response to the receipt of the response from the tax service 108, such as but not limited to displaying an error, enabling the user to proceed in completing the transaction, and/or submitting the transaction for fulfillment.

The transaction engine 120 and/or user interaction engine 112 may be utilized to process the response received from the tax service 108 and display results accordingly. For example, if the response indicates a rule is violated, the distribution application 104 may be configured to display a corresponding error, and/or highlight fields that need to be corrected. Examples of such errors include the state tax withholding amount entered in 824 not satisfying the rules indicated by content 822, and/or a required indicator, such as 832 (FIG. 8) and/or 952 (FIG. 9E) not being selected. If rule violations are present, the user may correct the errors and the modified request may be validated.

Figure 12:
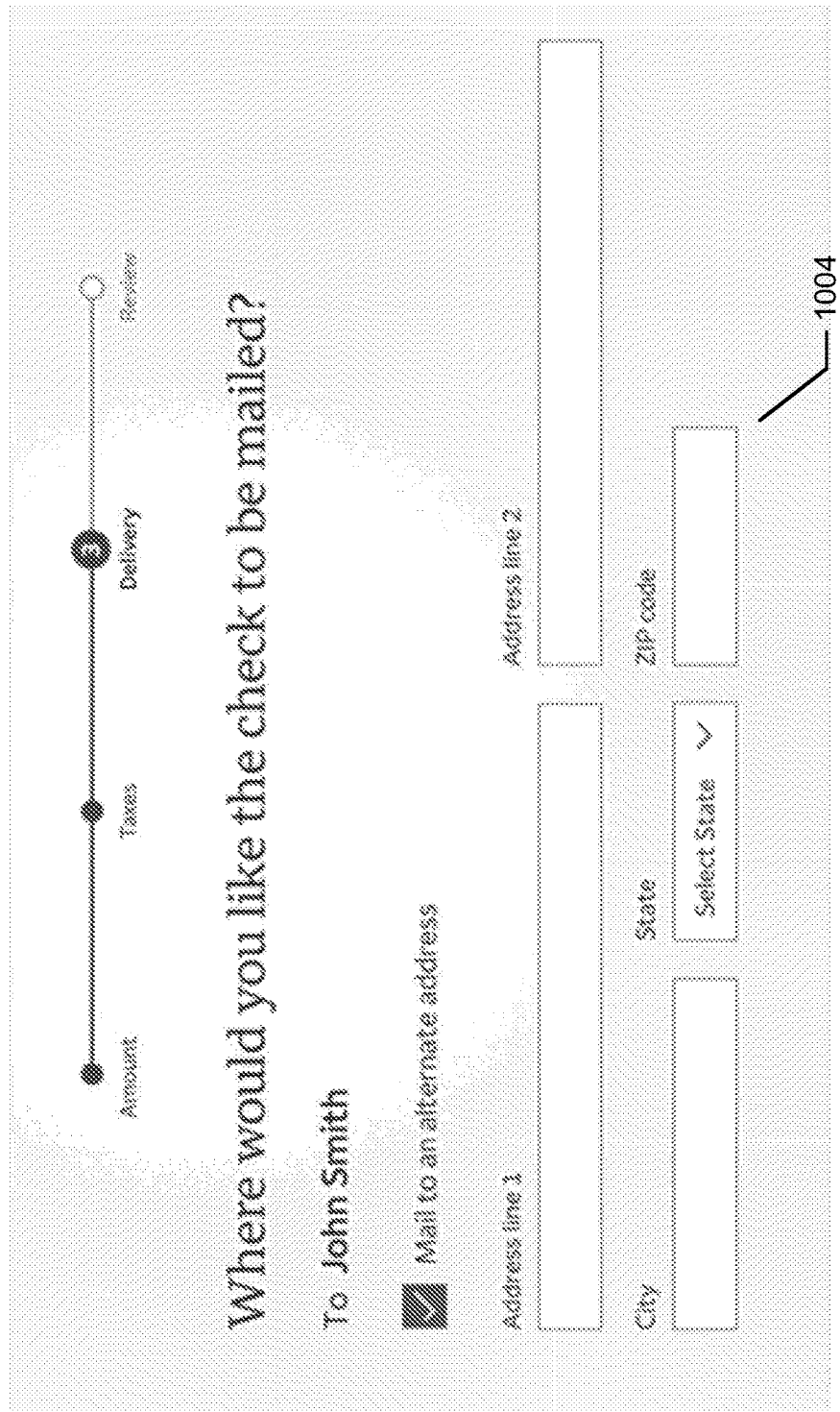

In instances in which no errors are present, the distribution application 104, such as with the transaction engine 120, may enable the user to proceed in entering details of the transaction, or completing the transaction, and potentially submitting the transaction for fulfillment, as described in further detail below with respect to operation 340. According to certain embodiments, enabling the user to proceed may comprise accessing additional user interface displays, such as those of FIG. 10-14, to provide additional information to the user and to collect additional information from the user such as a distribution type. Example distribution types 1000 provided in FIG. 10 that may be selected by user may include paper check by standard mail, paper check by overnight or expedited mail (which may include a fee, such as $15), deposit into bank account and/or transfer to account (e.g., automated clearing house (ACH)), wire (not shown), and/or the like. Example embodiments may further enable a user to confirm their mailing address and/or select to enter an alternate address at 1002 of FIG. 11, for mailing of the check. FIG. 12 illustrates an exemplary interface used to provide the alternate address details 1004, provided to the user if the user selects to enter an alternate address for mailing of a check. It will be appreciated that the fee service 170 may be invoked to provide fee amounts that may apply, such as fees for mailing checks, and/or fees charged for account liquidation.

Figure 13:

FIG. 13 provides an exemplary user interface that may be generated according to example embodiments. The exemplary user interface may be provided to enable the user to verify information before submitting the request for distribution for final validation and/or fulfillment. Example embodiments may therefore cause display of the account information 1010, gross distribution and net distribution amounts 1012, federal tax withholding amount and/or state tax withholding amounts 1016, and/or distribution method 1018.

According to certain embodiments, and as indicated in operation 334 of FIG. 3, apparatus 200 may include means, such as processor 212, memory 214, user interface 216, communication interface 218, and/or the like, for providing, via the user interface, a visualization of a breakdown of the retirement account distribution. The visualization, such as visualization 1020, may include a pie chart for example, and may comprise respective amounts of at least one of the distribution amount, the tax withholding amount, the federal withholding amount, and/or the determined fees. Additionally or alternatively, penalties for early distribution (prior to the account holder reaching a certain age as specified by federal law) may be applied. According to certain embodiments, only the aforementioned fees and/or withholding amounts that are non-zero may be displayed. The visualization may provide an indication to the user as to how the distribution is allocated, and the net distribution or net proceeds being provided to the customer via the selected distribution method. According to certain embodiments, the net distribution amount may differ from the net proceeds shown with respect to FIG. 9I, to account for fees applied based on subsequent selections by the user (e.g., distribution type of mail) and/or subsequent determinations by example embodiments (e.g., account liquidation fee). In this regard, the net distribution amount displayed on exemplary user interface 1020 may be considered a modified net distribution amount.

In any event, the user may select to edit any amounts, and return to the respective user interface display, and/or submit the request for distribution for validation and/or fulfillment. In this regard, example embodiments may transmit any of the information collected and/or displayed to the tax service 108, for re-validation as described above, and/or submit the request for fulfillment.

In certain example embodiments, according to the information provided via the user interface 216, and/or any of the exemplary user interfaces of the figures, a user may be dissatisfied with the net distribution amount or modified net distribution amount, because the user was expecting to directly receive a greater amount. As such, although not illustrated in the figures, example embodiments may enable a user may enter the desired net distribution amount, such that the distribution application 104 calculates the distribution amount needed, given the withholding requirements and fees, to net the customer the desired net distribution amount. In this regard, the proceeds engine 114 may perform the calculation, and a modified distribution amount, which provides the customer with the desired proceeds, may be populated into the transaction and provided for display.

As shown by operation 340, apparatus 200 may include means, such as processor 212, memory 214, user interface 216, communication interface 218, and/or the like, for optionally re-validating the retirement account distribution and/or submitting the retirement account distribution for fulfillment. According to certain embodiments, once the submit button 1025 is selected, the transaction may be re-submitted to the tax service 108 for an additional validation. If the transaction is validated with no errors, the transaction may be submitted for fulfillment, and example embodiments may provide a confirmation screen, such as user interface display 1040, which may provide a confirmation of any data associated with the transaction. Additionally or alternatively, responsive to selection of the submit button 1025, various other fulfillment-related processes may be initiated or may occur. Such fulfillment-related processes may include but are not limited to facilitating settlement, check remittance, electronic payments, wires, and/or the like. Accordingly, responses from the tax service as indicated by operation 330 may be received any number of times during the user interface interactions representing the request for a distribution, and the transaction may be validated any number of times by the tax service 108 prior to the submission for fulfillment. Users may be given the opportunity to correct any errors until no errors are present and they may submit the transaction for fulfillment. Because example embodiments may require that any errors be resolved before enabling the user to submit the transaction for fulfillment, example embodiments reduce, prevent, or eliminate non-compliant transactions from being submitted for fulfillment.

As described above with respect to FIG. 3, and the corresponding exemplary user interfaces of FIGS. 5-8, 9A-9I, and 10-14, the distribution application 104 enables users to view relevant information specific to their request for distribution, such as withholding requirements, and to enter information pertaining to their distribution accordingly. The flowchart of FIG. 4 provides exemplary operations performed by the tax service 108 for providing the tax withholding information to the distribution application 104 for display, validating the request for distribution, and/or maintaining the rules associated therewith.

As shown in operation 350, apparatus 200 may include means, such as processor 212, memory 214, user interface 216, communication interface 218, and/or the like, for maintaining tax withholding rules pertaining to state tax withholding requirements and federal tax withholding requirements. In certain embodiments, the tax service 108 may further maintain penalty rules. In this regard, the rules repository 150 may include any of the state tax withholding rules 152, federal withholding rules 154, penalty rules 156, and/or the like, and may be configured to store and provide content, configured for display by the distribution application 104 such that a user may obtain the relevant withholding information.

The rules repository 150 may be further configured to store information pertaining to withholding requirements. For example, the state tax withholding rules 132 and/or federal withholding rules 154 may comprise an indicator indicating whether withholding is allowed, and/or an indicator indicating whether opting out is allowed. The rules may further store minimum withholding rates.

Users, such as administrators and/or the like may access the tax service 108 to provide updates to certain rules, add new rules, and/or the like, such as when tax codes change. In certain embodiments, such as facilitated by the architecture depicted in FIG. 1, in which the tax service 108 is implemented independently from the distribution application 104, the changes may be made without any impact to the distribution application.

As shown by operation 354, apparatus 200 may include means, such as processor 212, memory 214, communication interface 218, and/or the like, for providing an API, such as API 142, to an interfacing application, such as the distribution application 104. The API may include any computer program code provided by the tax service 108 to enable interfacing applications or systems to utilize the functionality of the tax service 108. As described above, the distribution application 104 may pass required information to the API 142 in order to obtain tax withholding information and/or direct the tax service 108 to validate a request for distribution.

Accordingly, as shown in operation 358, apparatus 200 may include means, such as processor 212, memory 214, communication interface 218, and/or the like, for receiving requests via the API to provide scenario-specific withholding requirements. And, in operation 362, apparatus 200 may include means, such as processor 212, memory 214, communication interface 218, and/or the like, for providing the scenario-specific withholding requirements from the tax withholding rules pertaining to state tax withholding requirements and federal tax withholding requirements. The information received from the distribution application 104 via the API 142 may therefore be processed to determine which rules from the rules repository 162 apply to the request for distribution. In this regard, the relevant content may be provided by the tax service 108 to the distribution application 104 for display.

In operation 368, apparatus 200 may include means, such as processor 212, memory 214, communication interface 218, and/or the like, for validating distributions for scenario-specific withholding requirements by executing the tax withholding rules with data passed from the interfacing application. For example, once the distribution application 104 passes the entered federal tax withholding amount and/or state tax withholding amount entered by a user, to the tax service 108, example embodiments process any relevant rules using the withholding amounts and/or other information pertaining to the account. The validation engine 160 may identify which rules to process for a specific scenario, such as all federal tax withholding rules and the state tax withholding rules specific to the account holder's state. The rules may further include executable computer program code, that when executed by the validation engine 160, indicate rule violations (e.g., a non-compliant transaction) and/or that a distribution request is validated. Accordingly, a response indicating any such rule violations, and/or validation, may be returned to the interfacing application, such as the distribution application 104.

As introduced above, the service provider system 100 may be implemented in a variety of ways. According to example embodiments, distribution application 104 may make a series of calls to the tax service 108 via the API 142. For example, a call or multiple calls may be made to retrieve relevant tax withholding information. Upon or after entry of a federal withholding amount and/or state withholding amount, an additional call or calls may be made to the tax service 108 via API 142, to validate the federal withholding amount and/or state withholding amount relative to the relevant rules. Any number of validations may be performed by invoking the API 142 prior to submission of the transaction for fulfillment. In certain example embodiments, however, the distribution application 104 may call the API 142 to retrieve the withholding information, but also rule-relating data, such as state tax withholding minimums and/or the like. In this regard, parameters relating to the state tax withholding rules 152, federal withholding rules 154, penalty rules 156, and/or the like, may be provided to the distribution application 104, and cached. The distribution application 104 may therefore efficiently validate and re-validate certain rules in real-time or near real-time as data is entered, thereby decreasing the amount of communication and/or data transmissions between the distribution application 104 and tax service 108, otherwise utilized in embodiments in which separate calls for validation are made via the API 142. As such, caching certain rules or rule-related parameters by the distribution application 104 for execution by the distribution application 104 may, in some embodiments, reduce the expenditure of certain processing and/or memory resources. For example, the user entered federal withholding amount and/or state withholding amount may need not be transmitted to the tax service 108, as the distribution application 104 may perform certain validation and/or functionality of the validation engine 160.

The example embodiments provided herein therefore provide distinct improvements over prior transactional systems. Instead of a potential abrupt message to the user that they must call the custodian or service provider to complete a transaction, the user may complete the transaction in a self-service environment. Additionally or alternatively, the service provider system 100 can enforce the withholding rules such that the custodian is not placed at risk for facilitating transactions that are non-compliant with current withholding regulations.

Additionally or alternately, implementing the tax service 108 independently from the distribution application 104, and/or other interfacing applications, provides certain technical advantages to the service provider system 100. Administrators and/or other users may make updates to the rules repository 150 without impacting the API 142 and/or distribution application 104. New rules may be added to the rules repository 150, and configured to be activated beginning on a specified start date with no interruptions in service for the distribution application 104. Additionally or alternatively, the new rules may be activated such that they are immediately available and executed in response to a call via the API 142. In this regard, new tax regulation may be implemented within the tax service 108 and reflected in the distribution application 104, with no changes to the distribution application 104, and no rebooting, no restarting, no offline status, and/or no downtime for the distribution application 104.

Moreover, example embodiments apply the information processed by the distribution application 104 in a meaningful way, and provide a corrective action when it is determined a user has entered information that violates a withholding rule that should be enforced. The corrective action may comprise, for example, providing an indication, such as in the response from the tax service 108 to the distribution application 104. The corrective action may additionally or alternatively include processing the response such that the user interface 216 and/or user interaction engine 112 alerts the user of the error. The corrective action may additionally or alternatively include preventing a non-compliant electronic distribution transactions from being fulfilled. Whereas prior service provider systems may have allowed transactions to be fulfilled that violate one or more tax withholding rules, subjecting the service provider or custodian to risk, associated penalties, and/or costly transactions to reverse non-compliant transactions, example embodiments, may take corrective action by preventing such non-compliant transactions from being fulfilled.

Embodiment disclosed herein may also conserve processing resources. For example, processing resources otherwise expended to flag non-compliant transactions, track tickets used to resolve or reverse such transactions, transmit additional requests to correct withholding amounts, and/or the like, may be conserved. Specifically, example embodiments may conserve memory resources otherwise utilized for storing and tracking such issues, and/or the processing resources otherwise utilized to route communications and/or instructions relating to the resolution and/or reversal. As such, example embodiments may further provide technical advantages and/or improvements over existing service provider systems.

It will be appreciated that the figures are each provided as examples and should not be construed to narrow the scope or spirit of the disclosure in any way. In this regard, the scope of the disclosure encompasses many potential embodiments in addition to those illustrated and described herein. Numerous other configurations may also be used to implement embodiments of the present invention.

FIGS. 3 and 4 illustrates operations of a method, apparatus, and computer program product according to some example embodiments. It will be understood that each operation of the flowchart or diagrams, and combinations of operations in the flowchart or diagrams, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may comprise one or more memory devices of a computing device (for example, memory 214) storing instructions executable by a processor in the computing device (for example, by processor 212). In some example embodiments, the computer program instructions of the computer program product(s) which embody the procedures described above may be stored by memory devices of a plurality of computing devices. As will be appreciated, any such computer program product may be loaded onto a computer or other programmable apparatus (for example, apparatus 200) to produce a machine, such that the computer program product including the instructions which execute on the computer or other programmable apparatus creates means for implementing the functions specified in the flowchart block(s). Further, the computer program product may comprise one or more computer-readable memories on which the computer program instructions may be stored such that the one or more computer-readable memories can direct a computer or other programmable apparatus to function in a particular manner, such that the computer program product may comprise an article of manufacture which implements the function specified in the flowchart block(s). The computer program instructions of one or more computer program products may also be loaded onto a computer or other programmable apparatus (for example, apparatus 200 and/or other apparatus) to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. An apparatus for validating electronic distribution transactions from retirement accounts, the apparatus comprising a communication interface, at least one processor, and at least one memory including computer program code, the at least one memory and the computer program code configured to, with the at least one processor, cause the apparatus to:

receive, via a user interface generated on a user device, an indication of a request for a retirement account distribution from an account of a user associated with the user device, the request for the retirement account distribution comprising at least a distribution amount;

obtain, account information associated with the request for the retirement account distribution, the account information obtained from an account information database via the communication interface, wherein the account information comprises at least a state of residence and date of birth of the user;

generate an application programming interface (API) call for tax withholding requirements specific to the retirement account distribution requested from the account of the user, the API call generated based at least in part on the account information and parameters of an API of a tax service;

communicate the API call to the API of the tax service via the communication interface, wherein the tax service is configured to maintain tax withholding rules pertaining to state tax withholding requirements and federal tax withholding requirements based on scenario-specific distribution requests;

receive, from the tax service in response to the API call, information indicative of the tax withholding requirements specific to the account information and based upon the request;

display, via the user interface, a visualization based on the information received from the tax service, the information comprising a federal tax withholding amount and a state tax withholding amount;

display, via the user interface, interface elements configured to enable the user to modify one or more of the distribution amount, the federal tax withholding amount, and the state tax withholding amount;

display, via the user interface and based on a state of residence parameter, supplemental interface elements and an indicator, wherein the supplemental interface elements are in addition to the interface elements enabling modification of the distribution amount associated with the request, wherein the supplemental interface elements comprise state-specific withholding requirements associated with legal compliance required of the user, wherein the indicator is configured to enable, via the user interface, user-acknowledgement of user compliance with legal requirements, wherein the user-acknowledgement is required for the request for the retirement account distribution to be validated or fulfilled;

receive, via the indicator on the user interface, a user's acknowledgement of the user's compliance; and validate the retirement account distribution from the account of the user based at least in part on the user's acknowledgement of compliance with the state-specific withholding requirements.

2. The apparatus of claim 1, wherein the at least one memory and the computer program code are further configured to cause the apparatus to manipulate a portion of the account information to determine a value for a parameter of the API call for generation of the API call based at least in part on the account information and parameters of the API of the tax service.

3. The apparatus of claim 2, wherein the parameter for the API call comprises the state of residence parameter, the portion of the account information includes an address, and the at least one memory and the computer program code are further configured to cause the apparatus to parse the address to manipulate the portion of the account information to determine the value for the state of residence parameter of the API call.

4. The apparatus of claim 2, wherein the parameter for the API call comprises an age parameter, the portion of the account information includes a date of birth, and the at least one memory and the computer program code are further configured to cause the apparatus to calculate an age based on the date of birth to manipulate the portion of the account information to determine the value for the age parameter of the API call.

5. The apparatus of claim 1, wherein the at least one memory and the computer program code are further configured to cause the apparatus to generate a value for a parameter of the API call unavailable in the account information.

6. The apparatus of claim 1, wherein the at least one memory and the computer program code are further configured to cause the apparatus to generate the API call with an indication the account of the user will be terminated in response to fulfillment of the retirement account distribution.

7. The apparatus of claim 6, wherein the at least one memory and the computer program code are further configured to cause the apparatus to generate the API call with the indication in response to detecting an amount of the retirement account distribution equals a total balance of the account of the user.

8. The apparatus of claim 1, wherein the state-specific withholding requirements comprises an indication of whether state tax withholdings are required or voluntary.

9. The apparatus of claim 1, wherein the state-specific withholding requirements comprises a perjury declaration or a certification statement.

10. The apparatus of claim 1, wherein the state-specific withholding requirements comprises an indication that state tax withholdings are not permitted.

11. At least one non-transitory computer-readable medium comprising a set of instructions for validating electronic distribution transactions from retirement accounts, wherein the set of instructions, when executed by a processor, cause the processor to:

receive, via a user interface generated on a user device, an indication of a request for a retirement account distribution from an account of a user associated with the user device, the request for the retirement account distribution comprising at least a distribution amount;

obtain, account information associated with the request for the retirement account distribution, the account information obtained from an account information database via a communication interface, wherein the account information comprises at least a state of residence and date of birth of the user;

generate an application programming interface (API) call for tax withholding requirements specific to the retirement account distribution requested from the account of the user, the API call generated based at least in part on the account information and parameters of an API of a tax service;

communicate the API call to the API of the tax service via the communication interface, wherein the tax service is configured to maintain tax withholding rules pertaining to state tax withholding requirements and federal tax withholding requirements based on scenario-specific distribution requests;

receive, from the tax service in response to the API call, information indicative of the tax withholding requirements specific to the account information and based upon the request;

display, via the user interface, a visualization based on the information received from the tax service, the information comprising a federal tax withholding amount and a state tax withholding amount;

display, via the user interface, interface elements configured to enable the user to modify one or more of the distribution amount, the federal tax withholding amount, and the state tax withholding amount;

display, via the user interface and based on a state of residence parameter, supplemental interface elements and an indicator, wherein the supplemental interface elements are in addition to the interface elements enabling modification of the distribution amount associated with the request, wherein the supplemental interface elements comprise state-specific withholding requirements associated with legal compliance required of the user, wherein the indicator is configured to enable, via the user interface, user-acknowledgement of user compliance with legal requirements, wherein the user-acknowledgement is required for the request for the retirement account distribution to be validated or fulfilled;

receive, via the indicator on the user interface, a user's acknowledgement of the user's compliance; and validate the retirement account distribution from the account of the user based at least in part on the user's acknowledgement of compliance with the state-specific withholding requirements.

12. The at least one non-transitory computer-readable medium of claim 11, wherein the set of instructions, when executed by the processor, cause the processor to generate the API call with an indication the account of the user will be terminated in response to fulfillment of the retirement account distribution.

13. The at least one non-transitory computer-readable medium of claim 12, wherein the set of instructions, when executed by the processor, cause the processor to generate the API call with the indication in response to detecting an amount of the retirement account distribution equals a total balance of the account of the user.

14. The at least one non-transitory computer-readable medium of claim 11, wherein the state-specific withholding requirements comprises an indication of whether state tax withholdings are required or voluntary.

15. The at least one non-transitory computer-readable medium of claim 11, wherein the state-specific withholding requirements comprises a perjury declaration or a certification statement.

16. The at least one non-transitory computer-readable medium of claim 11, wherein the state-specific withholding requirements comprises an indication that state tax withholdings are not permitted.

17. A method for validating electronic distribution transactions from retirement accounts, the method comprising:

receiving, via a user interface generated on a user device, an indication of a request for a retirement account distribution from an account of a user associated with the user device, the request for the retirement account distribution comprising at least a distribution amount;

obtaining, account information associated with the request for the retirement account distribution, the account information obtained from an account information database via a communication interface, wherein the account information comprises at least a state of residence and date of birth of the user;

generating an application programming interface (API) call for tax withholding requirements specific to the retirement account distribution requested from the account of the user, the API call generated based at least in part on the account information and parameters of an API of a tax service;

communicating the API call to the API of the tax service via the communication interface, wherein the tax service is configured to maintain tax withholding rules pertaining to state tax withholding requirements and federal tax withholding requirements based on scenario-specific distribution requests;

receiving, from the tax service in response to the API call, information indicative of the tax withholding requirements specific to the account information and based upon the request;

displaying, via the user interface, a visualization based on the information received from the tax service, the information comprising a federal tax withholding amount and a state tax withholding amount;

displaying, via the user interface, interface elements configured to enable the user to modify one or more of the distribution amount, the federal tax withholding amount, and the state tax withholding amount;

displaying, via the user interface and based on a state of residence parameter, supplemental interface elements and an indicator, wherein the supplemental interface elements are in addition to the interface elements enabling modification of the distribution amount associated with the request, wherein the supplemental interface elements comprise state-specific withholding requirements associated with legal compliance required of the user, wherein the indicator is configured to enable, via the user interface, user-acknowledgement of user compliance with legal requirements, wherein the user-acknowledgement is required for the request for the retirement account distribution to be validated or fulfilled;

receiving, via the indicator on the user interface, a user's acknowledgement of the user's compliance; and validating the retirement account distribution from the account of the user based at least in part on the user's acknowledgement of compliance with the state-specific withholding requirements.

18. The method of claim 17, further comprising manipulating a portion of the account information to determine a value for a parameter of the API call for generation of the API call based at least in part on the account information and parameters of the API of the tax service.

19. The method of claim 18, wherein the parameter for the API call comprises the state of residence parameter, the portion of the account information includes an address, and the method further comprises parsing the address to manipulate the portion of the account information to determine the value for the state of residence parameter of the API call.

20. The method of claim 18, wherein the parameter for the API call comprises an age parameter, the portion of the account information includes a date of birth, and the method further comprises calculating an age based on the date of birth to manipulate the portion of the account information to determine the value for the age parameter of the API call.

* * * * *